(12) United States Patent
Hadiaris et al.

(10) Patent No.: US 10,158,650 B1
(45) Date of Patent: Dec. 18, 2018

(54) TOKEN VERIFICATION FROM INCREMENTAL INPUTS

(71) Applicants: Regis Hadiaris, Duluth, MN (US); Michael Finkenbine, Livonia, MI (US); Jay Farner, Bloomfield Hills, MI (US); Jonathan Osment, Plymouth, MI (US); Ryan Jackson, Ferndale, MI (US); Kristin Broadley, Detroit, MI (US); Ruth Lincoln, Detroit, MI (US); Jacob Engel, Troy, MI (US); Manoj Nagarajupalle, Farmington Hills, MI (US)

(72) Inventors: Regis Hadiaris, Duluth, MN (US); Michael Finkenbine, Livonia, MI (US); Jay Farner, Bloomfield Hills, MI (US); Jonathan Osment, Plymouth, MI (US); Ryan Jackson, Ferndale, MI (US); Kristin Broadley, Detroit, MI (US); Ruth Lincoln, Detroit, MI (US); Jacob Engel, Troy, MI (US); Manoj Nagarajupalle, Farmington Hills, MI (US)

( * ) Notice: Subject to any disclaimer, the term of this patent is extended or adjusted under 35 U.S.C. 154(b) by 0 days.

(21) Appl. No.: 15/873,710

(22) Filed: Jan. 17, 2018

Related U.S. Application Data

(60) Provisional application No. 62/618,421, filed on Jan. 17, 2018, provisional application No. 62/447,402, filed on Jan. 17, 2017.

(51) Int. Cl.
*H04L 29/06* (2006.01)

(52) U.S. Cl.
CPC ............ *H04L 63/12* (2013.01); *H04L 63/083* (2013.01)

(58) Field of Classification Search
CPC ....... H04L 63/12; H04L 63/083; H04L 63/08; H04L 63/0807; H04L 63/10; H04L 63/102; H04L 67/306; H04W 12/06; G06F 21/31; G06F 21/6218; G06F 21/33
USPC .......................................................... 726/9
See application file for complete search history.

(56) References Cited

U.S. PATENT DOCUMENTS

| | | | |
|---|---|---|---|
| 6,968,456 B1 * | 11/2005 | Tripathi | G06F 21/64 707/999.009 |
| 2003/0014633 A1 * | 1/2003 | Gruber | H04L 63/0823 713/170 |
| 2016/0224983 A1 * | 8/2016 | Cash | G06Q 20/40145 |

* cited by examiner

*Primary Examiner* — Yogesh Paliwal
(74) *Attorney, Agent, or Firm* — Kilpatrick Townsend & Stockton LLP

(57) ABSTRACT

A method of verifying an unverified token received may include accessing an external data store to receive data vectors that may be associated with a user of the client device; filtering data vectors that are not input data vectors; grouping data vectors into first groups based on a text field in each of the data vectors; selecting second groups from the first groups where each of the second groups include data vectors with a similar value field; selecting third groups from the second groups where each of the third groups includes data vectors with a similar input interval; for each of the third groups, determining a group value based on the value fields and input intervals; calculating an estimated token based on the group values for each of the third groups; and determining whether the unverified token can be verified by the estimated token.

20 Claims, 16 Drawing Sheets

TOKEN VERIFICATION FROM INCREMENTAL INPUTS

CROSS-REFERENCES TO RELATED APPLICATIONS

This application claims the benefit of U.S. Provisional Application 62/447,402 filed on Jan. 17, 2017, which is incorporated herein by reference. This application also claims the benefit of U.S. Provisional Application 62/618,421, which is incorporated herein by reference.

TECHNICAL FIELD

This application discloses technology related to the fields of data processing and data retrieval. Specifically, this application discloses technology solutions for aggregating estimates of an unverified token value based on programmatic inputs distributed through various sources at a regular or varying frequency.

BACKGROUND

Data sets may be stored in any computing medium, such as a database, data store, enumeration, collection, and so forth. With the advent of the Internet and cloud computing, these data sets may be available for remote client devices to access and evaluate. These data sets may include any collection related sets of information that is composed of separate elements, but which can be manipulated as a unit by a computer system.

Token verification describes a paradigm where a client device provides a token to a server that must be verified independently by the server to ensure that the token value is correct, and to possibly verify an identity of the user. Verification of the token value can unlock access to resources that the server can provide to the user of the client device.

SUMMARY

In some embodiments, a system for verifying an unverified token received from a client device may include a front-end website that receives the unverified token from a client device and a network interface that accesses one or more external data stores to receive a plurality of data vectors from the one or more external data stores. The plurality of data vectors may be associated with a user of the client device. The system may also include one or more processors and one or more memory devices including instructions that, when executed by the one or more processors, cause the one or more processors to perform operations including filtering data vectors from the plurality of data vectors that are not input data vectors. The operations may also include grouping data vectors from the plurality of data vectors into a first one or more groups based at least in part on a text field in each of the plurality of data vectors, selecting a second one or more groups from the first one or more groups, wherein each of the second one or more groups comprises data vectors with a similar value field, and selecting a third one or more groups from the second one or more groups, wherein each of the third one or more groups comprises data vectors with a similar input interval. For each of the third one or more groups, the operations may additionally include determining a group value based at least in part on the value fields and input intervals. The operations may further include calculating an estimated token based at least in part on the group values for each of the third one or more groups, and determining whether the unverified token can be verified by determining whether the estimated token is within a threshold amount of the unverified token.

In some embodiments, a method of verifying an unverified token received from a client device may include receiving the unverified token from a client device through a front-end website and accessing, through a network interface, one or more external data stores to receive a plurality of data vectors from the one or more external data stores. The plurality of data vectors may be associated with a user of the client device. The method may also include filtering data vectors from the plurality of data vectors that are not input data vectors, grouping data vectors from the plurality of data vectors into a first one or more groups based at least in part on a text field in each of the plurality of data vectors, selecting a second one or more groups from the first one or more groups, wherein each of the second one or more groups comprises data vectors with a similar value field, and selecting a third one or more groups from the second one or more groups, wherein each of the third one or more groups comprises data vectors with a similar input interval. For each of the third one or more groups, the method may additionally include determining a group value based at least in part on the value fields and input intervals. The method may further include calculating an estimated token based at least in part on the group values for each of the third one or more groups, and determining whether the unverified token can be verified by determining whether the estimated token is within a threshold amount of the unverified token.

In any embodiments, any of the following features may be included in any combination and without limitation. The method/operations may also include storing the plurality of data vectors in a system cache after receiving the plurality of data vectors from the one or more external data stores, receiving a subsequent request to re-verify the unverified token, and retrieving the plurality of data vectors from the system cache rather than the one or more external data stores through the network interface. Calculating the estimated token may include combining the group value of a first group in the third one or more groups with the group value of a second group in the third one or more groups. The method/operations may additionally include for each of the group values, determining whether the group values were scaled by an issuing computer system before being received from the one or more external data stores; determining scaling factors for the scaled group values; and applying the scaling factors to the scaled group values before calculating the estimated token. The scaling factors may be determined based at least in part on (i) a range of the corresponding group value, and (ii) characteristics of the user of the client device. The method/operations may further include determining a combination of the one or more third groups where the aggregated group values come within 90% of the unverified token value. The method/operations may also include determining whether each of the third one or more groups include at least three data vectors. The method/operations may additionally include extracting a character string from a text field of a data vector in the plurality of data vectors; accessing a database of character strings used to identify issuing computer systems; and selecting an issuing computer system based on the character string from the text field of the data vector. The database of character strings used to identify issuing computer systems may include a standardized name of each issuing computer system, and for each standardized name, a list of character strings that commonly appear in data vectors originating from the corresponding issuing computer system. The unverified token may be based on one or more verified values provided to a user of the client device from one or more issuing computer systems. The method/operations may also include adding or removing a task from a task list for a resource based on whether the token can be verified. The one or more external data stores may receive the plurality of data vectors from one or more issuing computer systems or one or more accumulator systems. The front end website may provide a portal for the client device to the one or more external data stores to log into the one or more issuing computer systems to release the plurality of data vectors.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
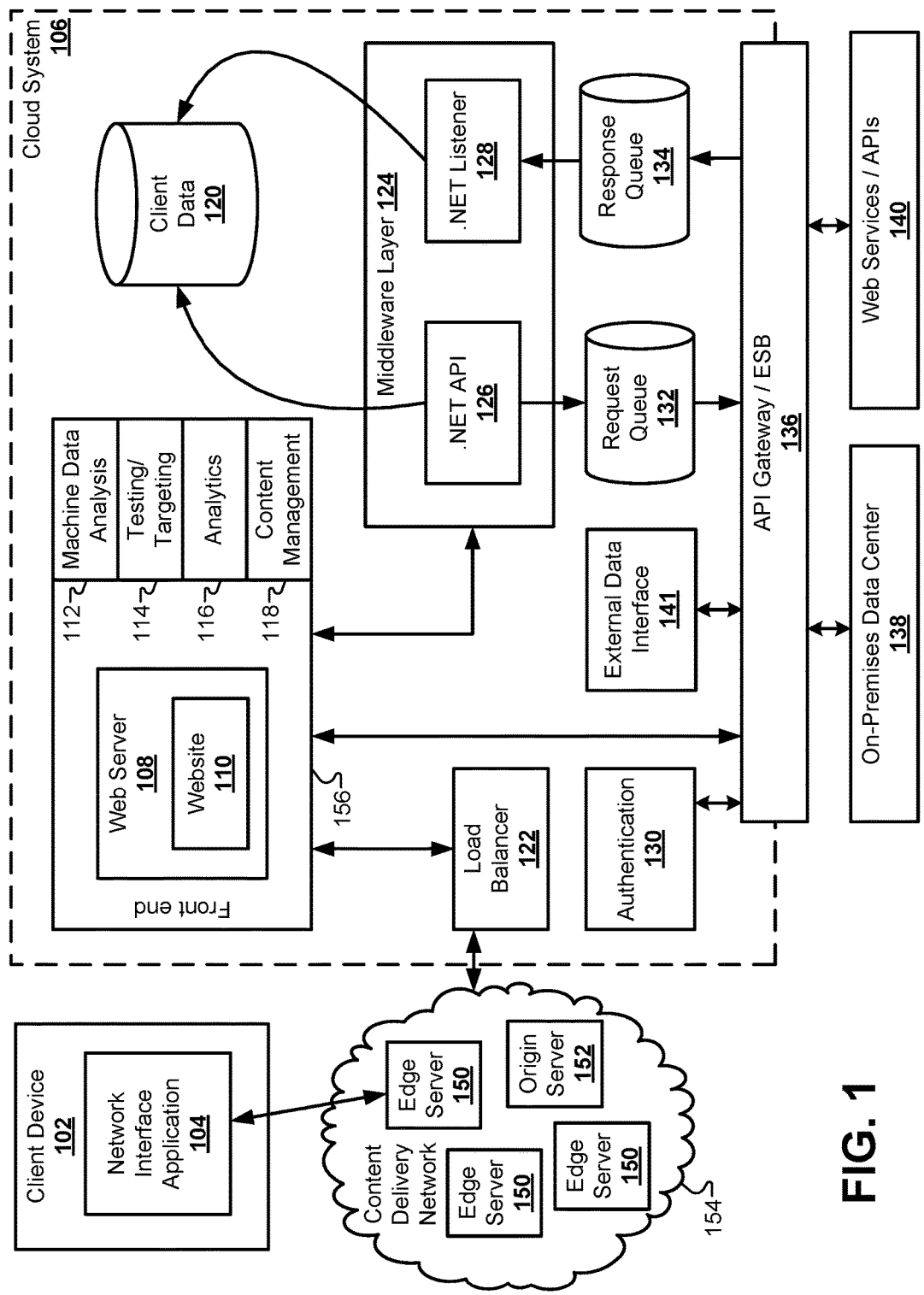
FIG. 1 illustrates a block diagram of a cloud system for receiving, importing, validating, and augmenting client data, according to some embodiments.

Described herein, are embodiments for verifying an unverified token received from a client device. Users may receive verified values from one or more issuing computer systems that they use to construct a token value. However, this token value will be unverified when providing it to the website. In other words, the website has no way of knowing whether the user has purposely or inadvertently altered the token value before providing it to the website. In order to provide access to resources provided by the website, the website may attempt to verify the unverified token value. To do so, the issuing systems may periodically send transmissions to accumulator systems. These accumulator systems can record these transmissions in data structures that are specific to the user of the client device. Individual entries in the data structures may be referred to as data vectors that include text and/or value fields that relate to the verified values issued by the issuing computer systems. To reconstruct an estimated token value, the website can use one or more external data stores to extract data vectors from one or more accumulator systems that are related to the user of the client device. After receiving the data vectors, the website can perform filtering and/or grouping operations to decode and reconstruct an approximation of the token value. As described in detail below, the website can filter data vectors that do not represent inputs sourced from issuing computer system and group data vectors by text field, value field, and/or input interval. Groupings can then be used to calculate group values. The group values can be scaled if necessary based on estimated scaling factors, and group values can then be used to estimate a token value. Although not exact, if the estimated token value is close enough to the unverified token, then the unverified token can be verified, and the requested resource can be provided to the user.

This system has numerous applications in the fields of computer security, resource security, and verifying certain attributes of a user and/or client device. In one application, the issuing computer systems and/or the accumulator computer systems can act as trusted third parties that store information related to the verified values securely. Each of these systems can be separate and distinct, physically and operationally, being operated by different entities. The data vectors stored at any one system may be kept confidential from data vectors stored at any of the other systems. The external data store may allow the user to securely log into the accumulator system(s) and allow the accumulator system(s) to provide the website with a subset of the data vectors stored therein. The website can then use the information provided by the user and by the external data stores to estimate a value for the unverified token. Thus, the token may represent a key or security value that is given to the user directly, and then only provided to the website in a distributed, fragmented, incremental fashion that requires the specific algorithms described herein to decode and reconstruct an estimate of the token.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a machine data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

The presentation of web forms may include a type of web form that allows the client device 102 to submit data provided by the user. The web form can receive data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use an external data interface 141 to verify the client data provided from the client device 102. The external data interface 141 may, for example, retrieve a history of data values from other computer systems that can be used to generate an estimate of certain fields in the web form provided by the user. For example, the external data interface 141 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The external data interface 141 may also retrieve data that can be used to supplement and/or correct information provided from the client device 102. Depending on the complexity of the web session, some users may be unwilling to manually enter all of the client data requested by the website 110. Other users may enter incorrect information accidentally or purposefully. The external data interface 141 provides an alternative to previous systems that required the user to manually provide all current data through the client device 102. Instead, the external data interface 141 can select at least a portion of the current data provided to the web form to automatically download a portion of the current data from the external data interface 141. For example, instead of manually typing current data values into the web form, the cloud system 106 can instead use a user identifier and/or user credentials to download a portion of the current data automatically through the external data interface 141. This process can decrease the amount of time required for the user to progress through the plurality of web forms, and can reduce user-injected errors into the client data. Information may be imported from the external data interface 141 as data packets. The external data interface 141 may access a third-party computer system that provides the imported data. After the client data is collected from the client device 102 and optionally supplemented/verified by data from the external data interface, the system can use the client data to generate a solution that includes one or more result sets.

Figure 2:
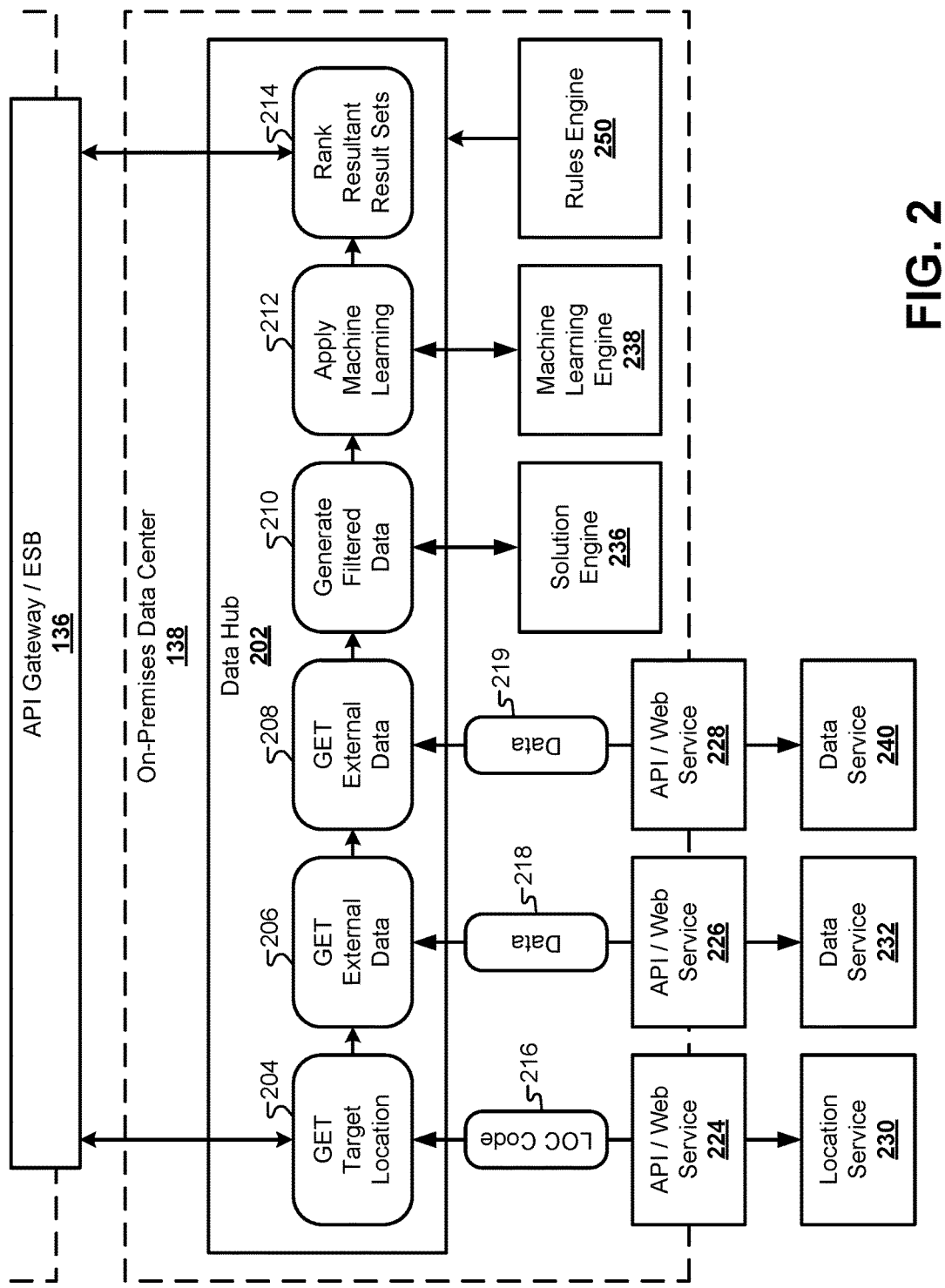
FIG. 2 illustrates a block diagram of a data center that may be used in conjunction with the cloud system, according to some embodiments.

FIG. 2 illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 2A is done by way of example and not meant to be limiting. Other embodiments may divide the functionality described herein between the cloud system 106 and the data center 138 in any combination of functions without limitation. In another embodiment, the architecture of FIG. 2 may have the software/hardware components from the data center 138 instead located in the cloud system 106.

The data center may include various databases that store client data, along with systems that provide content for the cloud system 106. To generate solutions based on the received client data, the data center 138 may include a data hub 202 that receives a packet of client data from the cloud system 106 and generates one or more result sets that are transmitted back to the cloud system 106. The data hub 202 may act as a central accumulator of the client data that finalizes the client data packet for generating a solution. Specifically, the data hub 202 may be made up of a plurality of processes that augment, format, filter, and process the client data in such a way that a solution engine 236 and a machine learning engine 238 can generate an optimal result set.

In some embodiments, the data hub 202 can augment the client data by executing a process 204 that requests a location code 216 from a location service 230 through an API/web service 224. The location code may designate a general geographic area to be associated with the client data. The data hub 202 may also include a process 206 that uses the location code retrieved from the location service 230 to retrieve rules or penalties 218 that may be applied to the candidate data sets based on location. The process 206 can send the location code through an API/web service 226 to a data service 232 specifically configured to provide such rules or penalties 218 for candidate data sets. These may include a cost that is applied to the data set based on the location from the location service 230. In some embodiments, a process 208 may retrieve additional data 219 from a data service 240 through an API/web service 228. The data 219 received from the data service 240 may include a rating for the user that may influence which particular candidate data sets that may be available to the user. The data service 240 may include a third-party service that provides a rating for the user that is based at least in part in some of the values provided in the client data from the user, as well as a previous history of the user.

After augmenting the client data, the data hub 202 can include a process 210 to generate a set of filtered data. As used herein, the term filtered data may refer to a specific subset of the augmented client data that is formatted for submission to the solution engine 236. The filtered data can be used by the solution engine 236 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 210 can select a subset of the information in the client data, format the filtered data accordingly, and send the formatted subset of the client data to the solution engine 236. In response, the solution engine can provide a plurality of candidate data sets from the collection of available data sets for consideration by the data hub 202.

Next, the data hub 202 can select one or more optimal data sets from the plurality of candidate data sets through a process 212 that accesses a machine learning engine 238. The machine learning engine 238 can use additional information from the filtered and/or client data. For example, the solution engine 236 may provide a plurality of data sets that are available to the user based on the filtered client data. The machine learning engine 238 can select an optimal subset of the available data sets to be transmitted back to the client device 102. A process 214 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 250 can execute a validation rule to ensure that the client data is valid (e.g., "is the value of the rate field greater than 0.00?"). The rules engine 250 can also determine which external data services may be used to retrieve data that is missing from the client data packet. For example, a rating from an external rating service may be required before candidate data sets can be selected. If the rules engine 250 determines that the client data set is missing this rating, it can cause the process flow of the data hub 202 to make a request to the external rating service to retrieve a rating for the user. Overall, the rules engine 250 can orchestrate the process flow of the different processes 204, 206, 208, 210, 212, 214, etc., in the data hub 202.

Figure 3:
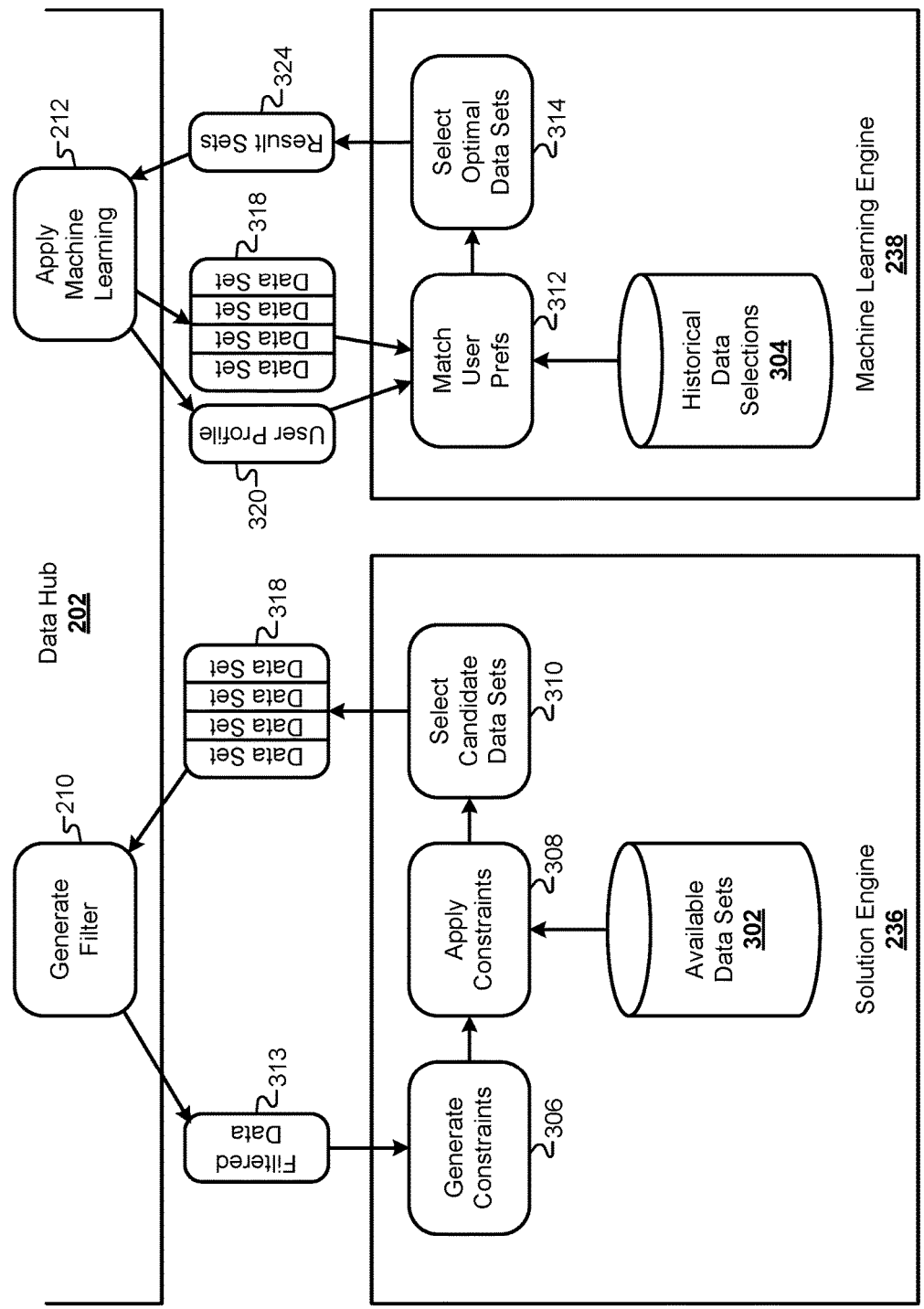
FIG. 3 illustrates a block diagram of how the solution engine and the machine learning engine generate result sets, according to some embodiments.

FIG. 3 illustrates a block diagram of how the solution engine 236 and the machine learning engine 238 generate result sets 324, according to some embodiments. The filtered data 313 can be passed to the solution engine 236, and process 306 can use the filtered data 313 to generate a plurality of rules and subsequent constraints to be applied to the available data sets. As described in greater detail below, the process 306 can use fields in the filtered data 313 to eliminate subsets of the available data sets, which can be expressed in constraints statements. For example, a determined data type may be used to eliminate certain data sets from the collection of available data sets. In some embodiments, the collection of available result sets may be categorized according to a type that may correspond to the data type in the filtered data 313. One or more constraint expressions may be constructed by the process 306 that would eliminate available data sets associated with that particular data type from the collection of available data sets for this particular set of filtered data 313.

After generating the constraints, the solution engine 236 can execute a process 308 that applies the constraint statements to the collection of available data sets. The collection of available data sets may be stored in a database 302, and may include thousands of different data set options. Data sets may be categorized based on a time interval, a rate, a source, and so forth. Data sets may also be categorized based on eligibility of the user based on augmented client data. In some embodiments, the constraint expressions can be applied in a single pass to each individual available data set; however, other embodiments may apply constraint expressions in multiple passes through the available data set. After the constraints are applied, a linear regression method 310 can be used to generate a set of candidate data sets 318. These candidate data sets may represent data sets for which the user may be eligible.

Next, the candidate data sets 318 can be provided to the machine learning engine 238. The machine learning engine can analyze the candidate data sets 318 and select one or more optimal data sets 314 from the candidate data sets 308. The machine learning engine 238 can use a collection of historical data selections 304 to determine the optimal data set(s) 314. For example, the client data provided by the user may be used to generate a user profile. The machine learning engine 238 can compare the user profile for this particular user to user profiles for previous web sessions associated with different users. The data set selections of previous users can then be used to determine which of the candidate data sets 318 would most likely be chosen by the current user.

For example, after each web session, the machine learning engine 238 can store the optimal data sets presented to each user, along with which of the optimal data sets was selected by each user in the collection of historical data selections 304. Additionally, the machine learning engine 238 can store the user profile derived from the augmented client data for each user with the selection information. When a new plurality of candidate data sets 318 is received for a new user, the augmented client data can be used to generate a similar user profile. For example, a set of values can be extracted from the augmented client data to generate a user profile 320. The user profile 320 can be matched to one or more historical user profiles. The final selections made by the users associated with the matched historical profiles can then be used to influence the selections made from the candidate data sets 318 for the current user. For example, if a number of previous users all selected certain types of optimal data sets that were presented, the previously selected optimal data sets can be ranked higher, based on this prior selection data. In essence, the machine learning engine 238 may use the expressed preferences of previous users to determine which of the candidate/optimal data sets are most likely to be selected by the current user.

Figure 4:
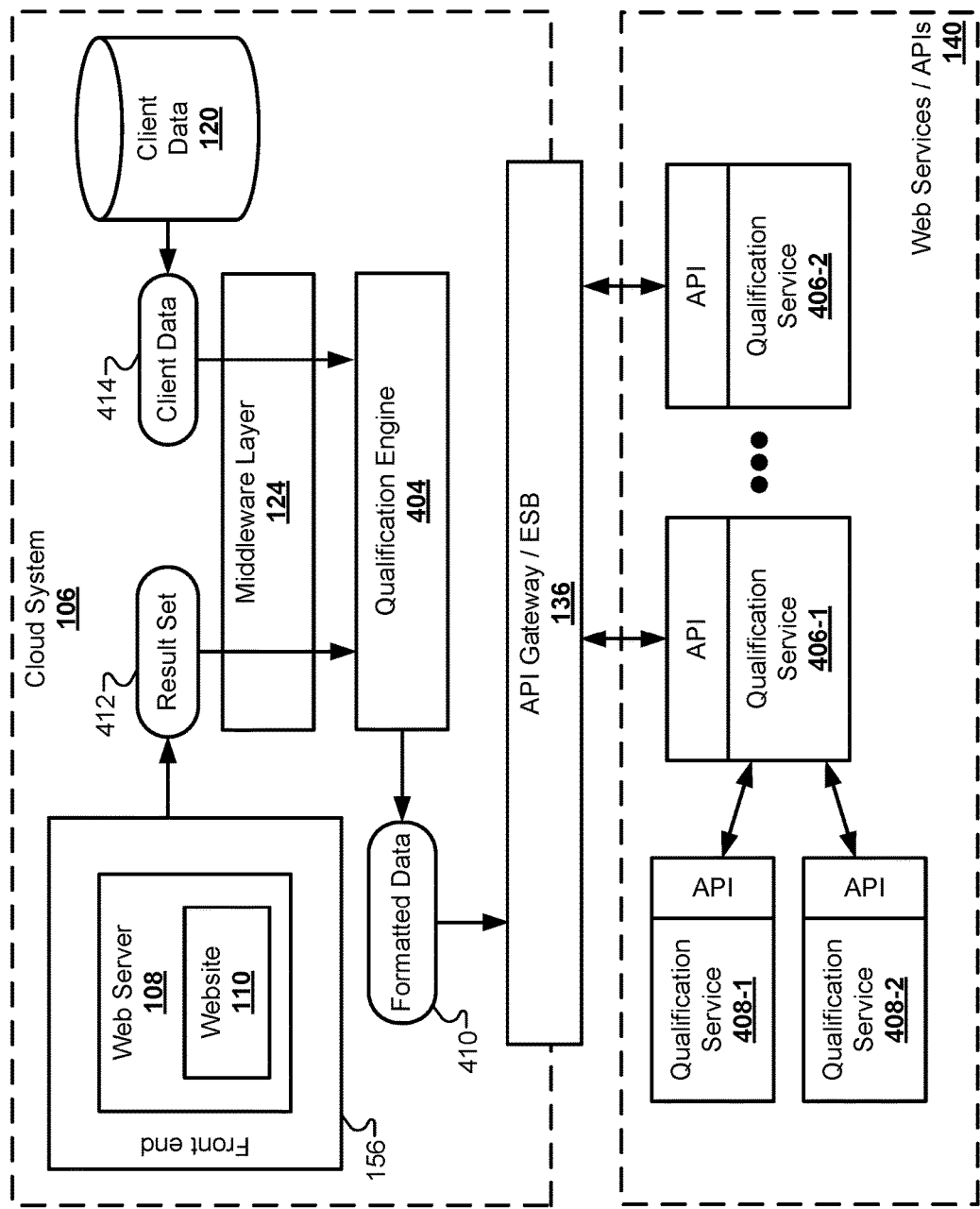
FIG. 4 illustrates a block diagram of the cloud system interacting with a plurality of qualification services, according to some embodiments.

FIG. 4 illustrates a block diagram of the cloud system 106 interacting with a plurality of qualification services 406, according to some embodiments. After the user has finalized the result set by adjusting values in the result set 324 through the web interface, the finalized result set 412 can be sent to a universal qualification engine 404 of the cloud system 106. The finalized result set 412 may include final values for the adjustable parameters that are set by the user, such as a final value for a rate field, a final value for a cost or penalty field, a final value for a time interval field, and so forth. Additionally, the client data that was collected, imported, augmented, and validated during the process described above may be stored in the client data database 120. The client data 414 may also be provided to the qualification engine 404.

After receiving the finalized rule set 412 and the client data 414, the qualification engine 404 can filter and/or combine data fields from the finalized result set 412 and the client data 414 to put together specific data packages that are required by each of the qualification services 406. Each qualification service 406 may require certain data points from the finalized result set 412 and/or the client data 414, and the qualification engine 404 can assemble data packages that match the requirements of each particular qualification service 406. Additionally, each qualification service 406 may require that each data packet be formatted according to specific requirements, such as a specific XML file format. The qualification engine 404 can format each data package according to the requirements of each particular qualification service 406.

Through the API Gateway/ESB 136, the qualification engine 404 can send data packages to one or more of a plurality of qualification services 406. Some qualification services 406 may be communicated with directly by the cloud system through a corresponding public API or web service interface. Secondary qualification services 408 may be accessible through another qualification service 406-1. In these cases, the data package can be formatted and selected based on the requirements of the qualification service 406-1, and a field or designator may be provided indicating that the qualification service 406-1 should send the request to a specific secondary qualification service, such as qualification service 408-2.

In some cases, each qualification service 406 may impose a penalty or cost on each submitted request. Therefore, it may be advantageous for the cloud system 106 to intelligently determine an order of precedence or ranking for the qualification services 406. When a plurality of qualification services are available, the cloud system 106 can rank each of the qualification services based on the criteria discussed below, then sequentially send requests to each of the qualification services 406 until an acceptable result has been returned. In some embodiments, the request may be sent simultaneously to each of the qualification services 406 without regard for a specific penalty for each. Instead, the system can analyze the results from each of the qualification services 406 to determine which of the results is most advantageous.

Figure 5:
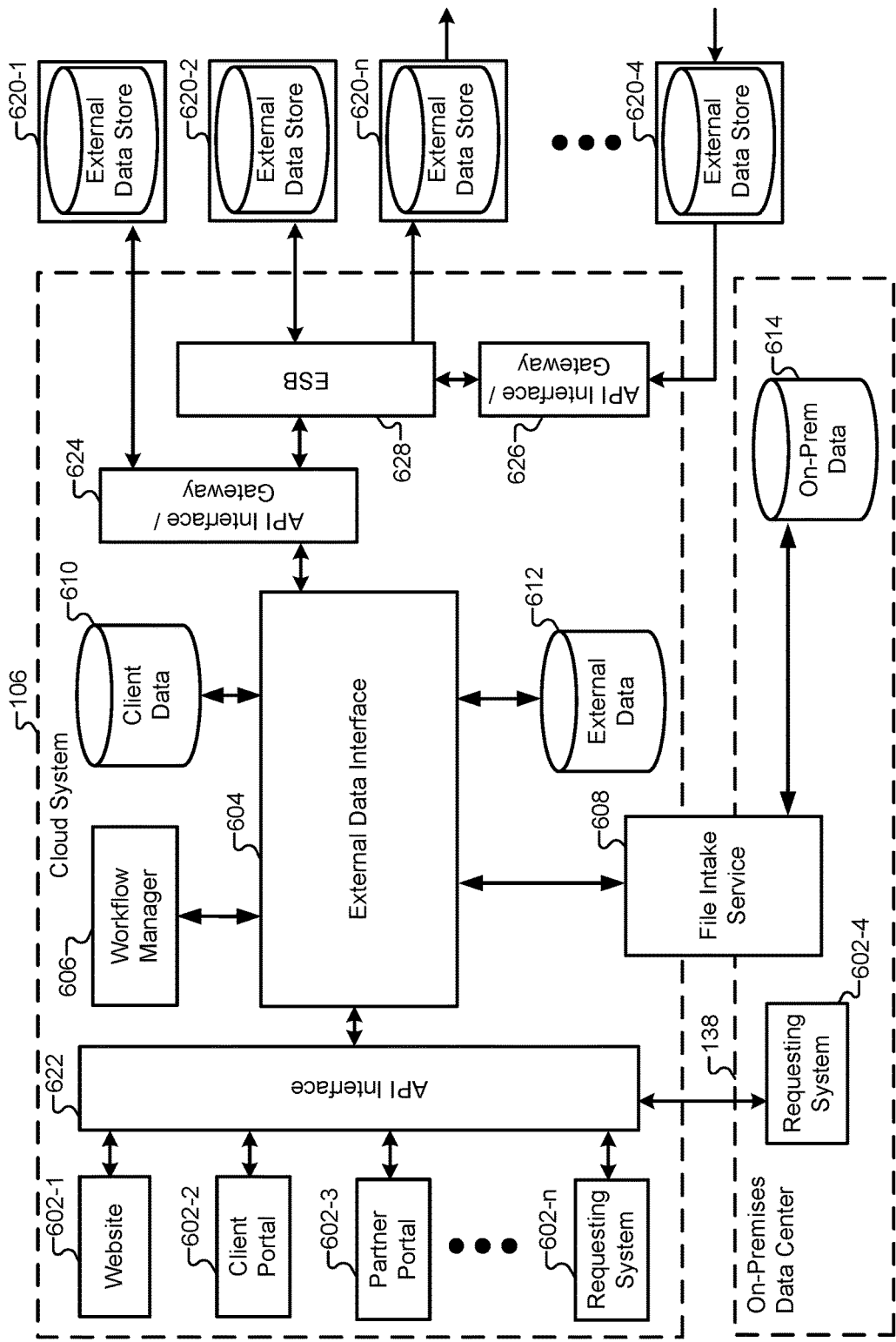
FIG. 5 illustrates an external data interface in the cloud system that can be used for extracting information from external data stores, according to some embodiments.

FIG. 5 illustrates an external data interface 604 in the cloud system 106 that can be used for extracting information from external data stores, according to some embodiments. As described above, the cloud system 106 may include a website 602-1. The website 602-1 can be used to initially collect information from the client device to begin the process described above. However, the website 602-1 may be just one of a plurality of possible requesting systems 602. These requesting systems 602 may include a client portal 602-2 allows client devices to access and edit their data sets after the process described above in FIGS. 1-4 to generate a final result set has been completed. The requesting systems 602 may also include a partner portal 602-3 that is a partner-facing web application used to feed client data to other systems. Some of the requesting systems 602 may be part of the same cloud system 106 as the external data interface 604. Alternatively or additionally, some of the requesting systems 602 may be part of the on-premises data center 138, such as requesting system 602-4. In other embodiments not explicitly shown in FIG. 5, some requesting systems 602 may also reside in other computing locations.

Together, the requesting systems 602 may be referred to herein as "internal" systems, in that they are internal to the cloud system 106 and/or the on-premises data center 138. This terminology can be used to differentiate the internal systems from the "external" data stores 620 that are being accessed. In some embodiments, the internal systems may all be operated by the same entity, whereas the external data stores 620 may each be operated by different entities. The internal systems also may be used for editing or collecting client device data from the client device for the process described above in FIGS. 1-4, whereas the external systems are used to supplement or verify information provided by the client device.

An API interface 622 may also be provided in the cloud system 106 to both identify and filter the requesting systems 602 (the internal systems) making requests, and to provide a uniform interface for each type of call that may be made to one of the external data stores 620. The API interface 622 can whitelist and/or blacklist any systems making a request. In some embodiments, each of the requesting systems 602 can be included on a whitelist such that no external systems can make calls through the API interface 622. In some embodiments, the API interface 622 can standardize the format for requests made to any external data store 620 using, for example, a REST interface. For example, POST or GET commands received through the API interface 622 can be used to extract data sets for single client identifiers, as well as batches of multiple data sets for multiple client identifiers.

In other embodiments, the API interface 622 may include a specified format for each subset of external data stores 620 that provide similar functions, provide similar services, and/or store similar data. For example, external data stores 620-1, 620-2 may each similarly provide a certain type of data that can be used to supplement client data in the same way. One function of the external data interface 604 and the API interface 622 is to abstract the details of selecting between all of the external data stores 620 to find the right subset of external data stores that can service the request from the client device, as well as selecting one of the subset of external data stores that can optimally service the request. Therefore, the API interface 622 may include standardized interfaces (e.g., POST/GET) for accessing similar types of data. When a command is received through the API interface 622, the external data interface 604 can determine the subset of external data stores 620 that are capable of servicing the request by virtue of the type of call received through the API interface 622. Each call that is specific to a subset of the external data stores may include parameters that are needed to access the corresponding subset of external data stores 620.

As will be described below in detail, the external data interface 604 can receive requests from the API interface 622 and proceed to check a localized cache for previous results, build a full request using stored client device data, select a single external data store from the identified subset of external data stores, and package the request in a format specific to the selected external data store. The cloud system 106 may include a client data store 610 that includes information received from the client devices, such as identification information that can be used to uniquely identify the user of the client device, and which can be used by the external data interface 604 to complete otherwise incomplete requests received through the API interface 622. The cloud system 106 may also include a database for external data 612 that has been previously extracted from the external data stores 620. The database for external data 612 can be used to service requests to the external data interface 604 without making an additional call to the external data stores 620 in certain situations described below.

After results are received from the external data stores 620, the external data interface 604 can store and analyze these data for future processes. A file intake service 608 may have portions that reside both in the cloud system 106 and in the on-premises data center 138. The file intake service 608 can receive data and documentation from the external data stores 620 and encrypt and transfer them to an on premises data store 614. The external data interface 604 can also perform certain evaluations to analyze the data received from the external data stores 620. In some cases, this analysis may verify information previously provided from the requesting systems 602 or augment the client data with information that has not yet been provided from the requesting systems 602. These evaluations may interface with a workflow manager 606 to both add and remove tasks specific to a particular client data set.

It will be appreciated that each of the external data stores 620 may include a web service interface or other standard API that includes formats or parameters that are very specific to each individual external data store 620. Therefore, before sending a request, the cloud system 106 may need to perform extensive formatting and repackaging of a request received through the API interface 622 before it is sent to the external data stores 620. One of the benefits provided by the system described herein is that the API interface 622 provides a standardized and stable interface for each of the requesting system 602 to make requests. As the web service interfaces of each of the external data stores 620 change over time, the external data interface 604 can be changed centrally to match the interfaces of the external data stores such that the requesting systems 602 are isolated from these changes. Put another way, the external data interface 604 and its surrounding APIs abstract the details of interfacing directly with the external data stores 620 from each of the requesting systems 602. Furthermore, when multiple external data stores 620 offer similar services, the external data interface 604 can abstract the process of determining which subset of the external data stores 620 are capable of servicing the request, as well as selecting one of the subset of external data stores 620 for servicing a particular request.

The process of formatting and packaging a request for the external data stores can be distributed between the external data interface 604, an API interface/gateway 624, and an Enterprise Service Bus (ESB) 628. The external data interface 604 may use a high-level programming language, such as C# or C++. Complex mappings between the data received from the API interface 622 and the required formats of the external data stores 620 can be performed in the external data interface 604, such as initially populating the request data fields and performing data transformations. Other lower-level mappings can be performed in the ESB 628, such as simple conversions between standardized formats (e.g., XML, and JSON). The ESB 628 can also provide a second layer of security by whitelisting/blacklisting systems such that only the external data interface 604 and other approved systems can make calls through the ESB 628 to the external data stores 620.

Another API interface/gateway 626 can be used for synchronous calls to external data stores 620. For example, each external data store 620 may have different session characteristics, including a session timeout interval. For some external data stores 620-4 that require a longer session (e.g., 90 seconds) to service requests, the API interface/gateway 626 can handle the timing and handshakes between the external data store 620-4 and the cloud system 106. For example, the external data store 620-4 may interface with another external system and act as a middleman between the external system and the cloud system 106. This may require a longer session interval while the external data store 620-4 interacts with the external system.

Figure 6:
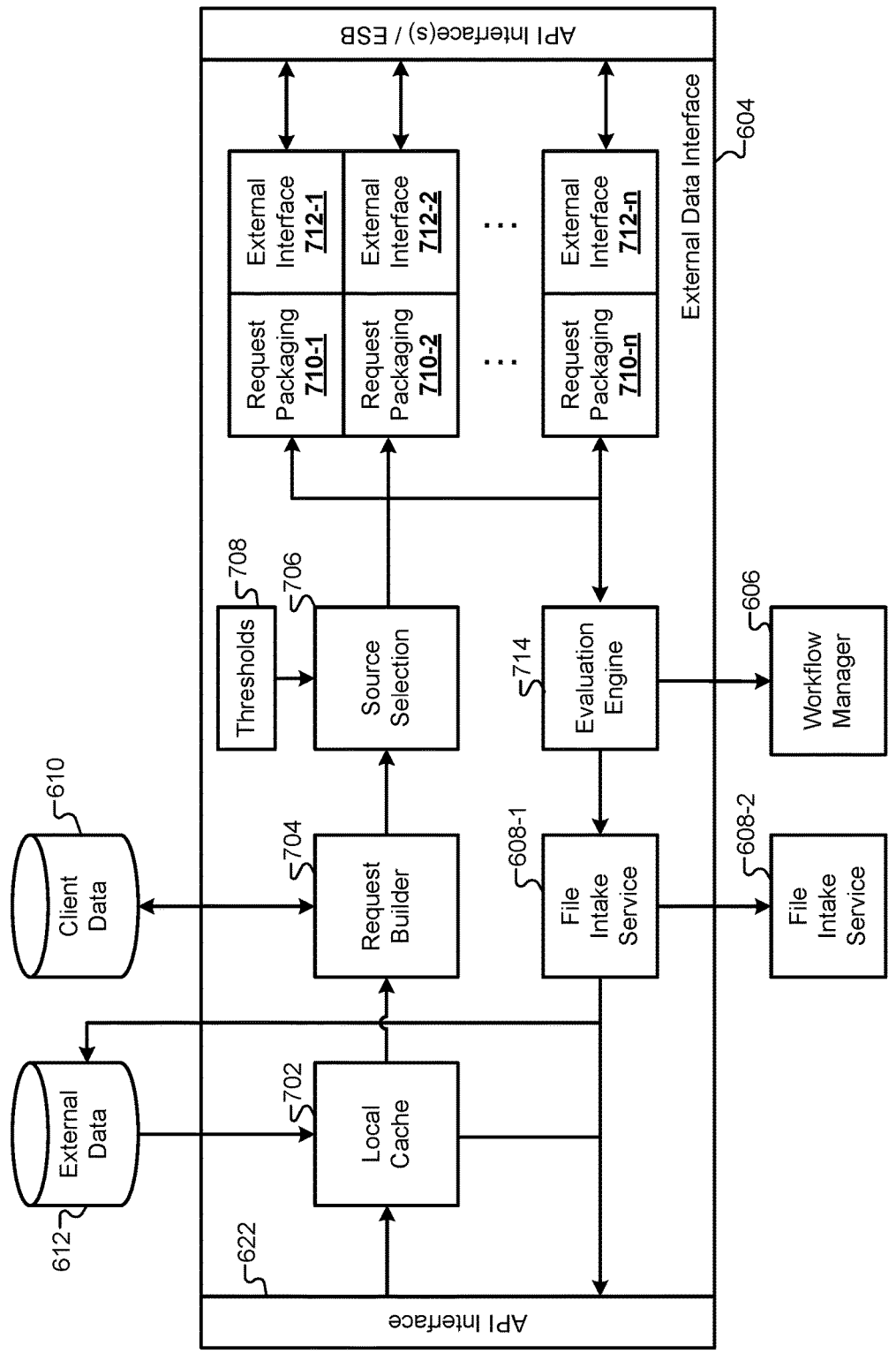
FIG. 6 illustrates a simplified block diagram of the external data interface, according to some embodiments.

FIG. 6 illustrates a simplified block diagram of the external data interface 604, according to some embodiments. After receiving the request through the API interface 622, the external data interface 604 can determine a type for the request. The type may be determined based on a particular call made through the API interface 622. For example, functions performed by the external data interface 604 may be associated with particular calls through the API interface 622. The external data interface 604 can receive a call and look up a subset of external data stores 620 that are capable of servicing the particular request type. Note that multiple calls may be made through the API interface 622 for the same subset of external data stores 620, such as both a GET and a POST call for a single functionality to service single and batch requests, respectively.

After receiving the request, and before accessing any of the external data stores 620, the external data interface 604 can execute a local cache function 702 that checks the database of external data 612 to determine whether the request can be serviced locally. The database of external data 612 can store data previously received from the plurality of external data stores 620. This can be useful for servicing duplicate requests where the resulting data sets have been recently retrieved from the plurality of external data stores 620.

If the local cache process 702 determines that a call needs to be made to the external data stores 620, the request can be forwarded to a request builder 704. The request builder can determine whether the information provided in the request is sufficient for the selected external data store to service the request. If additional information is needed, the request builder 704 can access the client data data store 610 to retrieve information that has previously been provided by the client device. This allows the request made through the API interface 622 to be fairly simple, providing, for example, only a client identifier when the actual requests made to the external data stores require a more substantial set of client data to service the request.

A source selection process 706 can take the identified subset of the plurality of external data stores 620 that are capable of servicing a request type, and select a single external data store to service this particular request. A stored set of thresholds 708 that can be dynamically updated in real-time can be used by the source selection process 706 to balance the manner in which requests are funneled between the plurality of external data stores 620.

As described above, once a single external data store is selected, it may require very specific formatting according to its exposed web interface. For each of the plurality of external data stores 620, the external data interface may include a specific request packaging function 710 and external interface 712. The request packaging function 710 can perform the high-level repackaging of the request received from the request builder 704 to match the format and data fields required by the selected external data store. The external interface 712 can then handle the interaction between the external data interface 604 and the selected external data store. One advantage provided by this system is that when the public interfaces of the external data stores change, the only changes that need to be made to the cloud system 106 can be isolated to the request packaging functions 710 and the external interfaces 712. Therefore, these changes and external-system-specific details can be abstracted from the rest of the cloud system 106.

The external interfaces 712 can handle all of the interactions with the external data stores 620, including initiating a session, handling the communication protocol, enforcing security requirements, and monitoring the individual timeout intervals. Each of these functions may be very specific to the particular external interface 712. After receiving a resulting data set from the external data stores, the request packaging functions 710 can translate any results received into a common format for the cloud system 106. Again, this ensures a stable data interface for any requesting system while abstracting the specific formatting details of the external data stores 620. The request packaging functions 710 can generate a standardized response with a payload that may be specific to each subset of external data stores (or request type). Thus, any requesting system 602 making a particular function call through the API interface 622 can receive a standardized response regardless of which of the plurality of external data stores 620 actually services the request.

Before being forwarded to the requesting system, the formatted response can be evaluated by an evaluation engine 714. For example, the data received from the external data store may be used to verify fields provided from the client device. The evaluation engine 714 can compare fields received from the client device to corresponding fields in the formatted response to determine whether the fields received from the client device can be verified. Some embodiments may use stored thresholds or other metrics in that comparison. For example, if a value provided by the client device is within 5%, 10%, 50%, 20%, etc., of the corresponding value provided from the external data store, then the value in the field provided by the client device can be verified. In another example, a value provided from the external data stores 620 can be analyzed without requiring comparisons to data received from the client device. Some external data stores may provide a score or metric for a user of the client device. This score can then be compared to predetermined score thresholds to determine whether certain actions need to be taken by the user of the client device, or whether the user of the client device is eligible for certain workflow options. The evaluation engine 714 can use the evaluation results to interface with the workflow manager 606. For example, if values provided from the client device can be verified using corresponding values received from the external data stores, then certain tasks can be eliminated from a client workflow in the workflow manager 606. Conversely, if these values cannot be verified, then the evaluation engine 714 can add tasks to the workflow, such as requiring additional and/or manual verification of these values.

Some embodiments may include a file intake service 608. The file intake service may include a first component 608-1 that is resident in the external data interface 604 and/or the cloud system 106, as well as a second component 608-2 that is resident on the data center 138. Some external data stores may provide documentation that can be used later to document and/or prove the data received from the external data stores 620. These documents are generally not needed in the external data interface 604 to service future requests, but may be required to complete the process described above in FIGS. 1-4, an may require secure storage. Therefore, the first component 608-1 can transfer documents and/or data to the second component 608-2 in the data center 138 to be encrypted and securely stored. In some embodiments, the first component 608-1 can generate a message that is sent to the second component 608-2 indicating that new data and/or documents are available. The second component 608-2 can then pull documents and/or documents from the first component 608-1, perform any necessary document format conversion, encrypt the results, and store them securely in the on-premises data store 614. Note that the second component 608-2 can pull documents from the first component 608-1 using batch requests or at a later time after the request is serviced. The second component 608-2 can also subscribe to messages or events produced by the first component 608-1.

The data retrieved from the external data stores 620 can then be returned in a response having a standardized format for the request type through the API interface 622. In some embodiments, results of the evaluation engine 714 can also be included in the response. For example, some responses can include a flag or indication denoting whether the data provided by the client device was verified by the data provided from the external data stores 620.

The data sets and final data sets described above may represent specifications describing a resource that is provided by the system, by an operator of the system, or facilitated through the system. These resources may be provided based on the accuracy of the user information provided above. Before actually providing the resource to the user, the system may need to verify the information provided by the user. This information may include a token that is constructed by the user based on verified values provided from issuing computer systems, and then provided to the system as part of the process described above. However, when receiving this token from the user, it may be unverified, or subject to errors that may have been injected by the user and/or the client device. Before providing the resources, this token value may need to be verified by the system. Described herein are embodiments for automatically verifying this value without human intervention and without an appreciable delay in processing that would deter a user from actually using the requested resource.

In some embodiments, a user may be given or more verified values, and the user can generate a token from the verified values. The value entered into the client device may be considered a token sent to the website. The website may use the token to grant a particular resource to the client device and/or the user. In some cases, the token may be verified to be entered correctly and not to be fraudulent. One or more issuing computer systems can provide the values to the user, and these provided values can be accumulated to form the verified value. Additionally, in a separate data path, the one or more issuing computer systems can provide components of the verified values to an accumulator computer system. The accumulator computer system can take the information from the issuing computer systems and form data vectors that are stored in a data store, such as a database, associated with the user. The accumulator computer system can receive the components of the verified values periodically at regular or irregular intervals. To verify the token, the website can extract the data vectors from the data store, and the system can then perform a number of filtering and grouping operations to reconstruct an estimate of the token. If the unverified token is within a threshold amount of the estimated total, the token can be verified. In some embodiments, the verification of the token can then be used to approve access to a resource, approve access to alternative resources, or deny access altogether.

This system for verifying tokens can have numerous applications. For example, verifying the token can be a way of validating an identity of a user. The issuing computer systems can provide one or more verified values to the user, and the user can construct the token based on the one or more verified values. To provide a second pathway for information associated with the verified values to be presented to the website, the issuing computer systems can break the verified values up into periodic inputs that are received over time. Thus, an eavesdropper would need to monitor the transmissions from the issuing computer systems for months or years to glean enough data to determine the verified values. Additionally, an eavesdropper would need to monitor the transmissions from each of the issuing computer systems providing verified values to the user. The accumulator computer system can collect transmissions from the issuing computer systems along with inputs from non-issuing computer systems and provide data vectors representing all of these inputs to the website for verification. In order to extract an estimate of the token, the website can then perform the filtering, grouping, cleansing, and/or scaling operations described below. This embodiment provides a method of securely verifying the token to verify the identity of the user.

Figure 7:
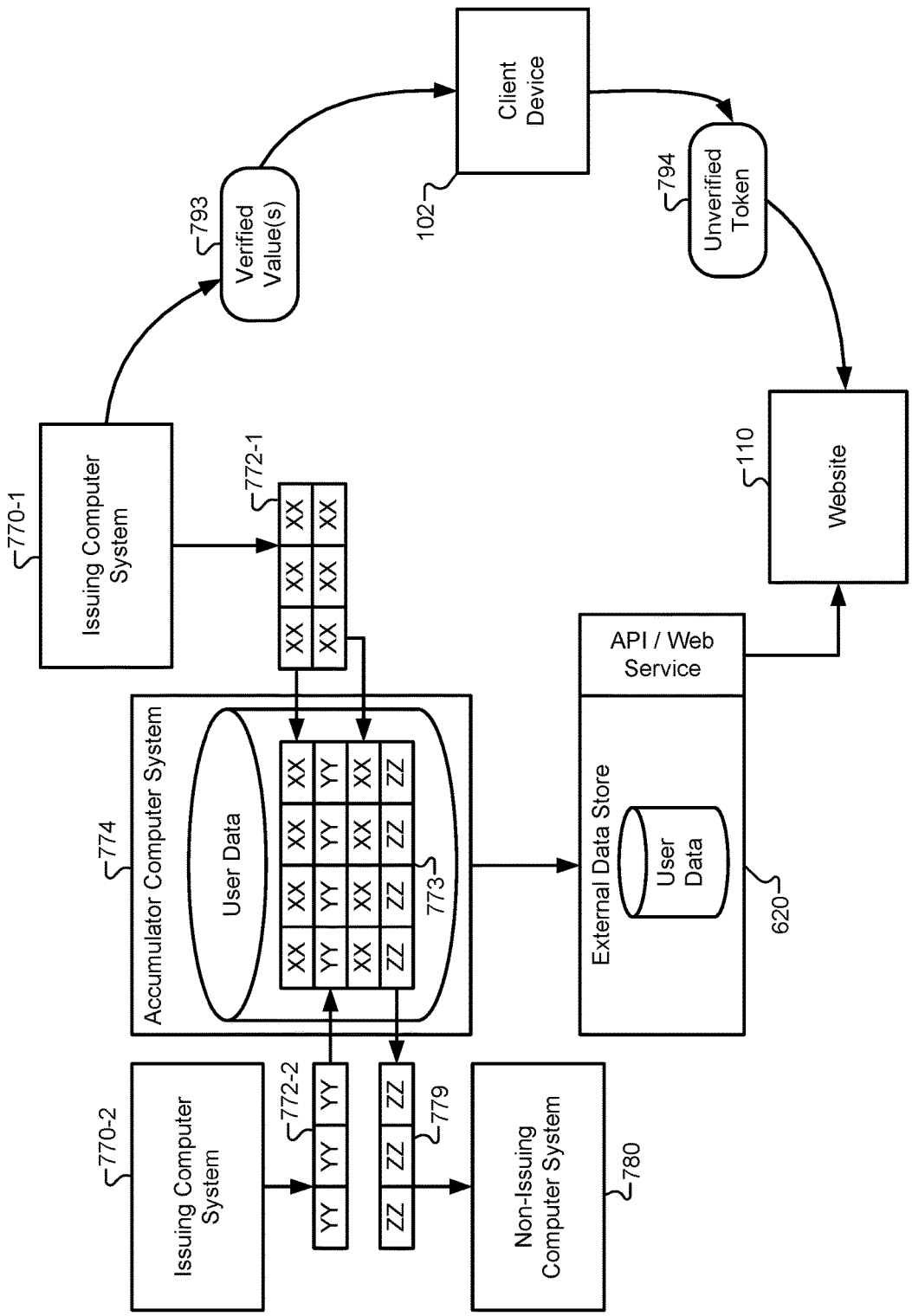
FIG. 7 illustrates a simplified block diagram of how an unverified token value and a plurality of data vectors from which the token value may be estimated are provided to the website, according to some embodiments.

FIG. 7 illustrates a simplified block diagram of how the token 794 and a plurality of data vectors 773 from which the token 794 may be estimated are provided to the website 110, according to some embodiments. First, one or more issuing computer systems 770 can provide one or more verified values 793 to the user of the client device 102. In one example, the issuing computer systems 770 can each provide single numerical values to the user that will be considered the verified values 793 from each source. In some embodiments, the verified values 793 may represent a secret code, a PIN, a token, and/or any other confidential information. The issuing computer systems 770 may be a middleman or trusted third-party that issues the verified values 793. The verified values 793 may be provided to the user by any communication method from the issuing computer systems 770, such as on printed media, by regular mail, by email, by text message, and/or the like. In some embodiments, a representative of the issuing computer systems 770 may verbally communicate the verified values 793 to the user.

The user may access the website 110 through a client device 102. The client device 102 may include any computing device, such as a smart phone, a smart watch, a PDA, a laptop computer, a desktop computer, a tablet computer, a voice-activated digital assistant, an augmented reality device, a virtual reality device and/or any other computing device that can receive inputs from the user and provide outputs. As used herein, the term "website" may include a traditional website or web form accessible through a web browser on a computer. This term may also encompass network-based access to a web server through an application running on a smart phone. Thus, claims referring to a website also encompass accessing a web resource through a dedicated application ("app") as well as through a traditional web browser.

The user may request a resource from the website 110. In order to determine which resources the user may be allowed to access, the website 110 may ask for a token 794. The user may construct the token 794 based on the verified values 793 received earlier by the user. For example, the user may aggregate the verified values 793 to generate the token 794. Note that in some embodiments, a single verified value may be used (i.e., there is only one issuing computer system). More than one verified value is not necessary. In this case, the token 794 will be approximately the same as the single verified value provided to the user. The user may provide the token 794 to the website by entering the token 794 into the client device 102.

The token 794 may be received by the website 110 as an unverified value. In other words, the website 110 may not have enough information at this point to verify that the token 794 accurately represents an aggregation of the verified values 793. Instead of manually reaching out to the issuing computer systems 770 to collect the verified values 793, the embodiments described herein provide a more secure and convenient way of verifying the token 794 by the website 110.

In some implementations, each of the issuing computer systems can break each of the verified values 793 down into a plurality of components values, or simply "components" 772. The components 772 can be used to reconstruct each of the verified values 793. In a security context, the issuing computer systems 770 can break down the verified values using an algorithm, such as a variation of Shamir's Secret Sharing (S3) algorithm to deconstruct the data into one or more data segments. Each of these data segments can be packaged as components 772 or transmissions to an accumulator computer system 774. These components 772 can be delivered periodically over time such that they are never delivered all together. For example, the components 772 can be individually transmitted in sequence every 5 days, every 10 days, once a week, twice a month, every 2 weeks, once a month, every 2 months, once a year, and so forth. This incremental transmission of data components 772 can protect both the user and the issuing computer system.

The accumulator computer system 774 may receive transmissions that include data components 772 from each of the issuing computer systems 770. The components 772 in these transmissions can be associated with a timestamp and stored in a data store as data vectors in a data structure. In addition to the data value components in the timestamp, additional columns or fields may be added to each of the data vectors to represent or classify the type of transmission. These additional fields will be described in greater detail below in relation to FIG. 4. As used herein, the term "data vectors" may be used to represent a node in a data structure. For example, this may represent a row of data in a traditional database table. Each data vector may be a data structure received in an array of data structures from the external data store. This may also represent a node in a linked list, an element in an array, a field in an XML document, and so forth. In addition to receiving transmissions from the issuing computer systems 770, the accumulator computer system 774 may also receive transmissions from non-issuing computer systems 780. The data components 779 received from the non-issuing computer systems 780 can be used to generate data vectors and stored in the same data store as the data vectors generated from the issuing computer systems 770. The data vectors from both sources can be stored in a specific data structure associated with the user. This mingling of data from both issuing and non-issuing sources can further obfuscate the data received from the issuing computer systems 770. Furthermore, the accumulator computer system 774 may also at its own data vectors to the plurality of data vectors 773 in the data store as transmissions to the non-issuing computer systems 780. Thus, the accumulator computer system 774 may add additional data vectors to the data structure that are not associated with the verified values 793.

To reconstruct an estimate of the verified values 793, the website 110 can download a copy of the plurality of data vectors 773 from the accumulator computer system 774. In some embodiments, the website 110 can communicate directly with the accumulator computer system 774 to download the plurality of data vectors 773. In other embodiments, the website 110 may require the user credentials to access the plurality of data vectors 773 at the accumulator computer system 774. In these embodiments, the website 110 can use an external data store 620 with an API or web service that allows the user to login to the accumulator computer system 774 through the client device 102 without providing credentials to the website 110. The external data store 620 can then download the plurality of data vectors 773 from the accumulator computer system 774. The website can then establish a secure link with the external data store 620 and retrieve the plurality of data vectors 773 from the external data store 620 without needing to securely access the accumulator computer system 774. This process will be described in greater detail below in relation to FIG. 9. In some embodiments, users may have data structures stored at a plurality of accumulator computer systems. The external data store 620 can be used to login and download a plurality of data vectors from each of the accumulator computer systems to which the issuing computer systems 770 transmit data components 772 for the verified values 793.

Figure 8:
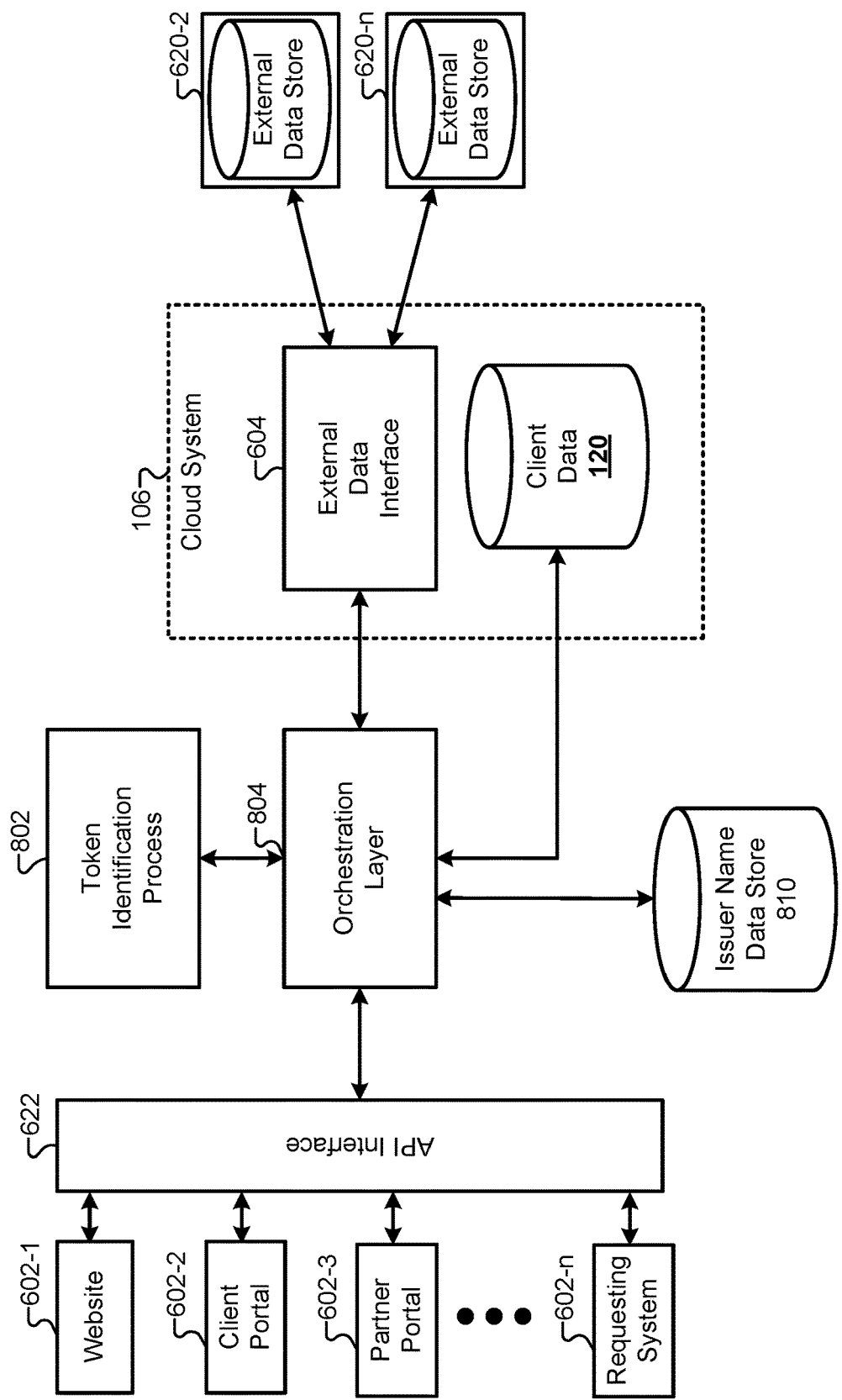
FIG. 8 illustrates a token identification process that can be used to construct a token estimate, according to some embodiments.

FIG. 8 illustrates a token identification process 802 that can be used to construct a token estimate, according to some embodiments. As described above, the system may include a plurality of requesting systems 602, such as the website 602-1, the client portal 602-2, the partner portal 602-3, and so forth. These requesting systems 602 can communicate with the system through the API interface 622. A request can be received through the API interface 602 from any of the requesting systems 602 to verify an unverified token value. The token may be provided as part of the process described above in FIGS. 1-4 for collecting client data sets and generating a final data set. Specifically, the token may be provided as one of the portions of client data received from the client device 102. The resource in question may be defined by the finalized data set, and/or any other data sets provided to the client for finalization. As part of generating, selecting, finalizing, and locking a data set, the system may need to verify the unverified token value before the process can be completed.

To verify an unverified token value, the system may also include a token identification process 802. This process may reside in the on-premises data center and/or on the cloud system 106. Although the token identification process 802 is depicted in the cloud system 106 in FIG. 8, this is done merely by example and not meant to be limiting. The token identification process can receive the unverified token value from the client device 102. To verify this token value, the token identification process can submit a request to the external data interface 604 as described above. The external data interface 604 can initiate a communication session with one or more external data stores 622 retrieve the data vectors that include fragments of the verified values that can be used to estimate the token value. In some embodiments, the external data interface 604 can directly download data vectors from the external data stores 620. In other embodiments, the external data interface 604 can directly download the data vectors from the accumulator computer system. In some embodiments described in detail in relation to FIG. 9 below, the external data interface 604 can initiate a secure communication session between the client device, the external data stores 620, and/or the accumulator computer systems.

Regardless of the method used, the token identification process 802 can be provided with sets of data vectors, referred to herein as a "plurality of data vectors" from one or more external data stores 620 and/or one or more accumulator computer systems. Specifically, the plurality of data vectors may include sets of data vectors from different data structures within the accumulator computer systems and may be retrieved through a plurality of different external data stores 620. Some embodiments may analyze each set of data vectors from a particular external data store and/or accumulator computer system separately, while other embodiments may group them together and analyze them in a combined fashion.

The system may also include a client data data store 120. As described above, the external database 604 can save data records that are received from any external data store 620. The client data data store 120 may be referred to herein as a "cache" or a "local cache." The plurality of data vectors can be stored in the local cache when they are retrieved through the external data interface 604. As they are stored in the local cache, they can be reused again in the future. For example, during an initial session with the system, the client device 102 may provide an unverified token to be verified. Because this is the first session, the token identification process 802 can make a request to the external database 604 to download the plurality of data vectors. The external data interface 604 can first determine that the local cache in the client data data store 120 does not already have a store set of data vectors for this user, which is the likely outcome during the first session between the system and the user. The external data interface 604 can retrieve the data vectors and provide them to the token identification process 802 and to the client data data store 120. Providing the resource to the user may require multiple sessions spread out over, for example, a few weeks. The token value may need to be reverified multiple times during these sessions, and the verification request may come from a plurality of different requesting systems 602 besides just the website 602-1. The subsequent re-verification requests can be routed as usual to the token identification process 802, then to the external data interface 604. However, instead of reaching out to the external data stores 620-2, the external data interface 604 can retrieve the previously stored copies of the data vectors for the token identification process 802. This feature reduces the bandwidth through an external network required to verify a token. This feature also increases the speed with which a verification can take place, becoming nearly instantaneous for the user because they no longer have to wait for data vectors to be downloaded from the external data stores 620.

The token identification process 802 can also communicate with an orchestration layer 804. The orchestration layer 804 can coordinate how the verification or failure of verification of the token affects the overall process flow. For example, if the token is verified, tasks can be removed and/or inserted into a process workflow managed by the orchestration layer 804. Similarly, if the token cannot be verified, tasks can also be added and/or removed to the process workflow managed by the orchestration layer 804. For example, failure to verify the token value may require additional security procedures to be completed before the resource is granted to the user.

The system may also include an issuer name data store 810. As will be described below in detail, each of the data vectors may include a text field that includes some indication of a corresponding issuing computer system from which the data vector was sourced. Although the identifier in the text field may be fragmented, abbreviated, obfuscated, and/or otherwise not complete, the system can maintain the issuer name data store 810 as a table that links together the known names associated with the issuing computer systems with the identifiers that can be isolated and identified in the text fields of the resulting data vectors.

Figure 9:
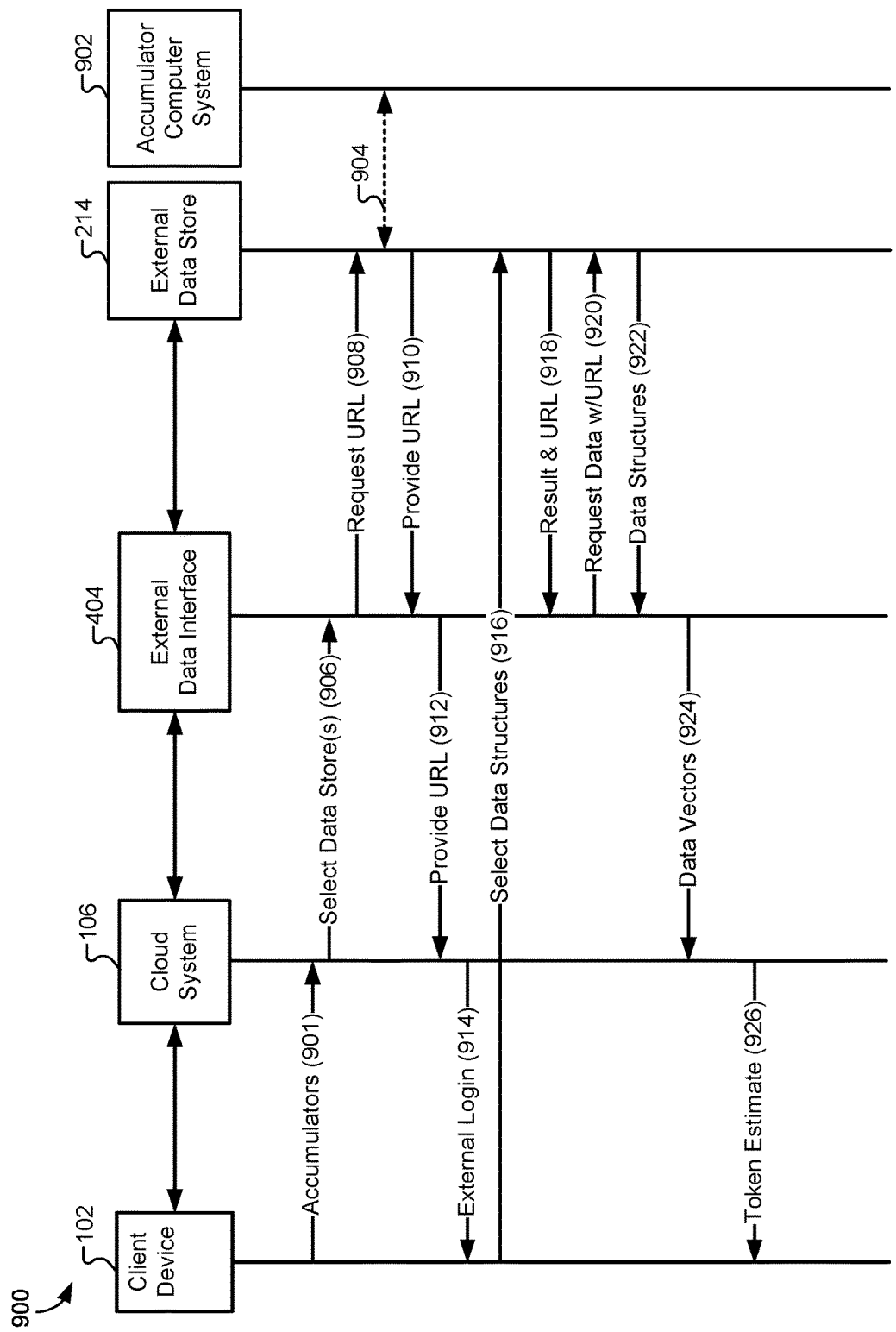
FIG. 9 illustrates a flow diagram of a process for requesting data vectors for verifying a token, according to some embodiments.

FIG. 9 illustrates a flow diagram 900 of a process for requesting data vectors for verifying a token, according to some embodiments. Here, the user can provide a designation of one or more accumulator computer systems storing data vectors and data structures associated with the user (901). The website 110 can format the request according to the standard API interface, and send the request through the token identification process to the external data interface 404 (906). In some embodiments, the external data interface 404 can also select between various external data stores 214 to select the best external data store from the list as described above. For example, the external data interface 404 can select among a plurality of external data stores 214 to select the service providing the longest history of data vectors. In another example, some external data stores may not be linked to all accumulator computer systems, and a particular external data store 214 may be selected that provides the best access. In some embodiments, multiple external data stores may be accessed in a single session to retrieve data vectors from multiple accumulator computer systems 902.

Instead of interfacing directly with the external data stores 214 to retrieve data vectors for the user, the external data stores may represent a data service that provides access to a number of different accumulator computer systems 902 (904). The external data store 214 maintains an interface with the accumulator computer systems 902 to provide access to individual data structures for various users that store the data vectors. However, because the user typically needs to login and select data structures to be shared, a communication session may be established between the client device 102 and the external data store 214 directly. Therefore, the external data interface 404 can send a request to the external data store 214 to initiate a communication session (908). The external data store 214 can respond with a URL (910). The external data interface 404 can pass the URL to the website 110 (912) and the website 110 and/or client device 102 can execute the URL to provide a link to the external data store 214 (914).

The communication session between the client device 102 and the external data store 214 can provide an "experience" such that the external data store provides user interfaces and data selection mechanisms that allow the user to login to a selected accumulator computer system 902 and select data structures comprising data vectors that should be shared with the external data interface 404 (916). In some embodiments, the user's login credentials are not shared with the cloud system 106 or the external data interface 404, but are instead only exchanged between the client device 102 and the external data store 214. In some embodiments, the steps can be repeated by the user for numerous data structures within the same accumulator computer system 902, numerous data structures available across different accumulator computer systems, and/or numerous data structures available through different external data stores.

When the user finishes selecting data structures that should be shared with the external data interface 404, the communication session can be terminated. In response, the external data store 214 can send results and/or a URL to the external data interface 404 (918). The external data interface 404 can then use the URL to request copies of the data vectors in the data structures. In some embodiments, the external data store 214 may only provide a subset of the data vectors stored in each data structure. For example, the external data store 214 may only provide data vectors received by the accumulator computer system 902 in the last 30 days, 60 days, 90 days, and so forth, up to 2 years. The external data interface 404 can also use the URL to request documents from the external data provider 214 (920), and then provide the documentation to the file intake service for local and/or off-cloud storage (922). The data vectors can then be provided to the token identification process 802 or the cloud system 106 (924) and the token estimate website 110 and a summary of the data vectors or treat can be displayed on the client device 102 for the user (926).

Figure 10:
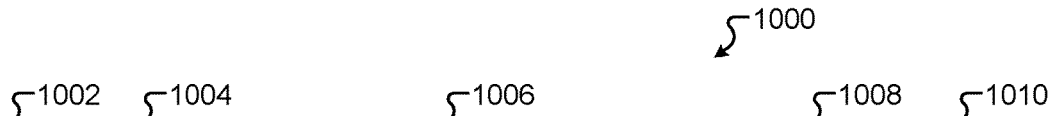
FIG. 10 illustrates a sample plurality of data vectors that may be received from a single data structure at an accumulator computer system.

FIG. 10 illustrates a sample plurality of data vectors 1000 that may be received from a single data structure at an accumulator computer system. It will be understood that this set of data vectors 1000 is merely exemplary and not meant to be limiting. Many other data fields/columns may be included that are not specifically shown in FIG. 4 for clarity. In one example, the set of data vectors 1000 may include a field 1004 that characterizes the data vector as an input, an output, and/or an input likely received from issuing computer system (referred to herein as a "Value Input"). The characterization in field 1004 may be made by the accumulator computer system when that particular data vector is received. Each data vector may also include a text field 1006 that may provide a text code and/or textual description of the data vector, a field 1008 with a timestamp for when the data vector was received, and a field 1010 with a value for the data vector. In some embodiments, the external data store may include a field 1002 that further characterizes the data vector as an input, an output, a value input, and/or the like. In the example of FIG. 10, the field 1002 includes an "VI" for each data vector identified as a value likely received from an issuing computer system. As described below, this field 1002 can be used by the system to further filter the plurality of data vectors 1000.

Figure 11:
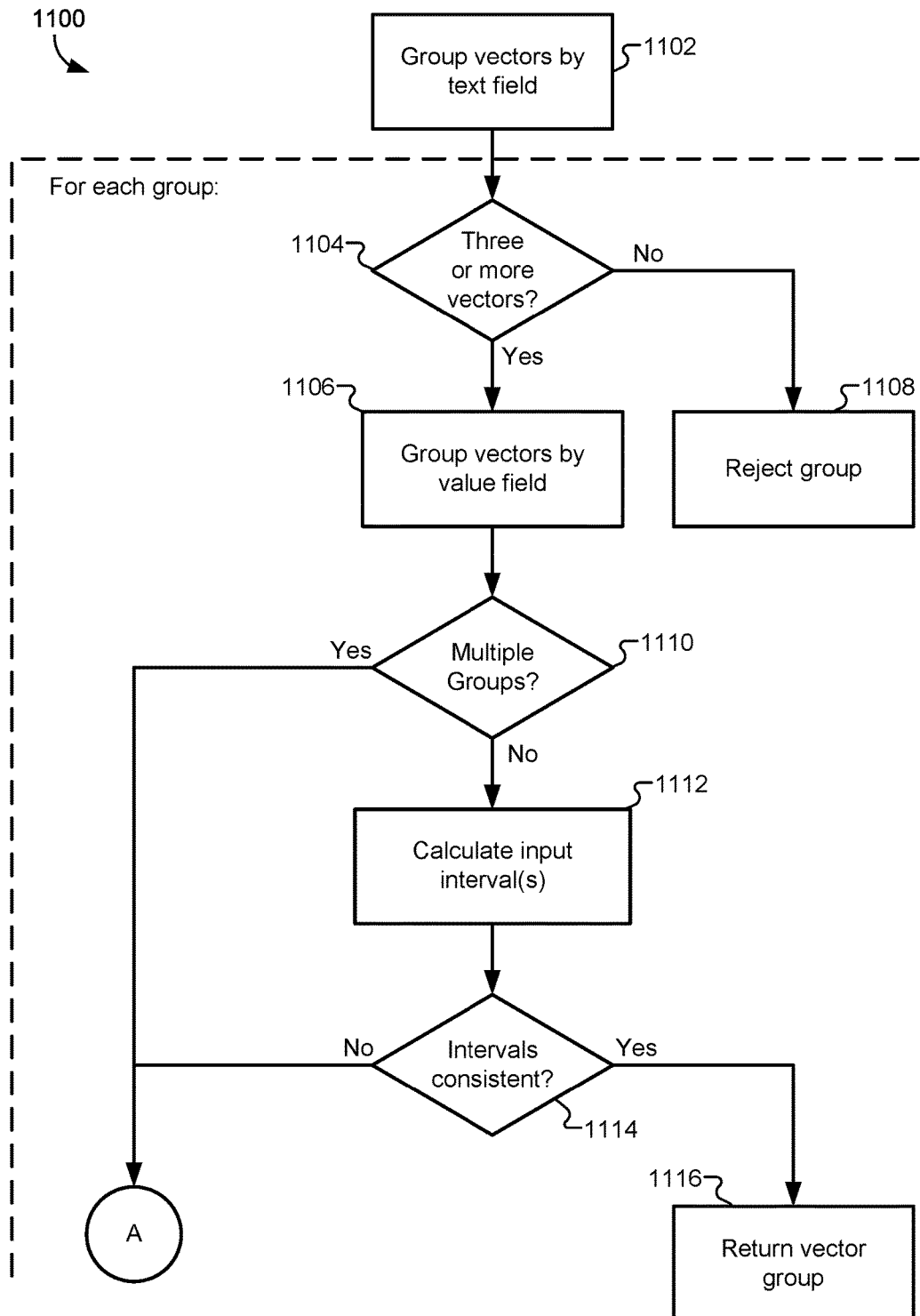
FIG. 11 illustrates a flowchart of a first phase of a method for grouping data vectors, according to some embodiments.

FIG. 11 illustrates a flowchart 1100 of a first phase of a method for grouping data vectors, according to some embodiments. As described above, the grouping process can consider all data vectors received from a single accumulator computer system. Alternatively, this method can handle data vectors received from a plurality of different accumulator computer systems. The method may begin by grouping vectors by text field (1102). Part of this step may include filtering out data vectors that are not identified as input data vectors. Data vectors sent out from the accumulating computer system are typically not related to inputs received from the issuing computer systems, and thus are not likely to be helpful in estimating a token value. Some embodiments may also include filtering out data vectors that are not identified as sent directly from an issuing computer system to the accumulator computer system. This may be done by virtue of the tags 1002, 1004 described above in each of the data vectors.

In some embodiments, data vectors from issuing computer systems can be identified by virtue of keywords that can be whitelisted and found in the text fields of the data vectors. For example, the substring "VAL ISS" may identify an issued value from issuing computer system. Other whitelist values may be more obscure or kept secret from the public. These white list terms can also be used to classify a group as representing a scaled value or an unscaled value as described in greater detail below.

In some embodiments, grouping vectors by text field may be accomplished by using an approximate string matching algorithm. Many of the text fields may include input numbers, and other extraneous information that would differentiate the text field of two data vectors received from the same accumulator computer system for the same data structure. In some embodiments, a Levenshtein distance can be calculated between the text fields of each of the data vectors. The Levenshtein distance is a string metric for measuring the difference between two sequences that allows inexact matches to be found. The Levenshtein distance between two strings is the minimum number of single-character edits required to change one string into the other string, and may thus also be referred to as the "edit distance." Other embodiments may also use different string distance metrics and/or pairwise string alignments to compare two strings.

To create groups based on the text fields, the method may begin with a first data vector in a group by itself. The next data vector can have the text field compared to the text field of the first data vector to calculate the Levenshtein distance. If this algorithm detects a similarity in the text field above a predetermined threshold (e.g., 70%, 75%, 80%, 85%, etc.) then the next data vector can be added to the group with the first data vector. If the algorithm detects a similarity below the predetermined threshold, then the next data vector can form a new group of data vectors. Subsequent data vectors can have their text fields compared to the text fields of data vectors in each existing group, and form groups if sufficient similarity is not calculated. By using the Levenshtein distance or other similar algorithms, the text fields in a batch of data vectors can be matched without requiring extensive filtering and reformatting of the text fields to identify the commonalities. Instead, the algorithm can handle minor differences to find approximate matches. Additionally, some embodiments may use a fuzzy matching process on the text fields and only match specific sub strings, such as the first 15 characters and/or the last 15 characters in the text field.

After grouping data vectors by text fields, each group of data vectors can be analyzed separately to determine whether they represent a single verified value provided from issuing computer system. The following operations in relation to FIGS. 11-13 can be performed for each group identified as described above. For each group, the method may include determining whether the group includes three or more data vectors (1104). As the verified values are fragmented and received from the issuing computer system periodically, a sufficient number of data vectors may need to be received to have confidence in the corresponding estimated value. If fewer than three data vectors of a received, the group can be rejected (1108) as not representing a verified value that can be estimated. These groups of data vectors are not likely to represent a continuous stream of inputs from an issuing computer system, and are therefore not typically representative of a verified value used to construct the unverified token received from the client device. Rejecting small groups can eliminate one-off inputs from an issuing computer system that do not contribute to the verified values.

For groups that include three or more data vectors, the method may also include grouping vectors by the value field (1106). The value field may be a numerical field in the data vector that contributes to the verified value in the token. As described above, the grouping by value field can be performed incrementally by forming a first group from a first data vector having a first value in the value field, then sequentially comparing each data vector to that value. If the values of subsequent data vectors deviate a more than a predetermined threshold amount (e.g., 2%, 5%, 8%, 10%, 15%, 25%, etc.,) then new groups can be formed. The method may then include determining whether multiple groups have been created based on the value field (1110). If multiple groups of data vectors have been formed, the multiple groups can be passed to a subsequent stage of the method described in FIG. 12. If only a single group still remains from all of the data vectors grouped now by both text field and value field, the method can continue processing the single group.

If a single group remains, the method may include calculating an input interval for the group's data vectors (1112). An input interval can be defined as the time between when the accumulator computer system receives fragmented inputs from the issuing computer system. As described above, each data vector may include a field representing a timestamp of when the data vector was received from the issuing computer system. The timestamp can be used to determine whether there is a substantially uniform interval between each successive data vector. In some embodiments, the time interval may be measured in terms of days. Day ranges can be established, and intervals between data vectors that fit within the same day ranges can be considered to have the same input interval. For example, a range of between 5-9 days can be considered a weekly input interval. A range of between 10-14 days can be a bi-weekly interval. A range of between 15-25 days may be a semi-monthly interval. A range of between 25-31 days can be a monthly interval. This allows for small discrepancies, such as transmission delays between the issuing computer system and the accumulator computer system due to network outages, network delays, holidays, processing delays, and so forth.

If a consistent interval can be calculated between each of the data vectors in the group (1114), then the group can be considered a representation of a specific verified value from the issuing computer system. The group can then be returned as a group of vectors (1116). Some embodiments may also calculate a group value for the group as it is returned. A group value can be calculated based on the average value in the value field for each of the data vectors and the interval. The group value may be representative of a value that would be represented if all the data vectors that would be received over a time period were in the group, such as one year or one month. If instead the method detects multiple groups having inconsistent intervals, the multiple groups can be passed to a subsequent stage of the method in FIG. 12.

Figure 12:
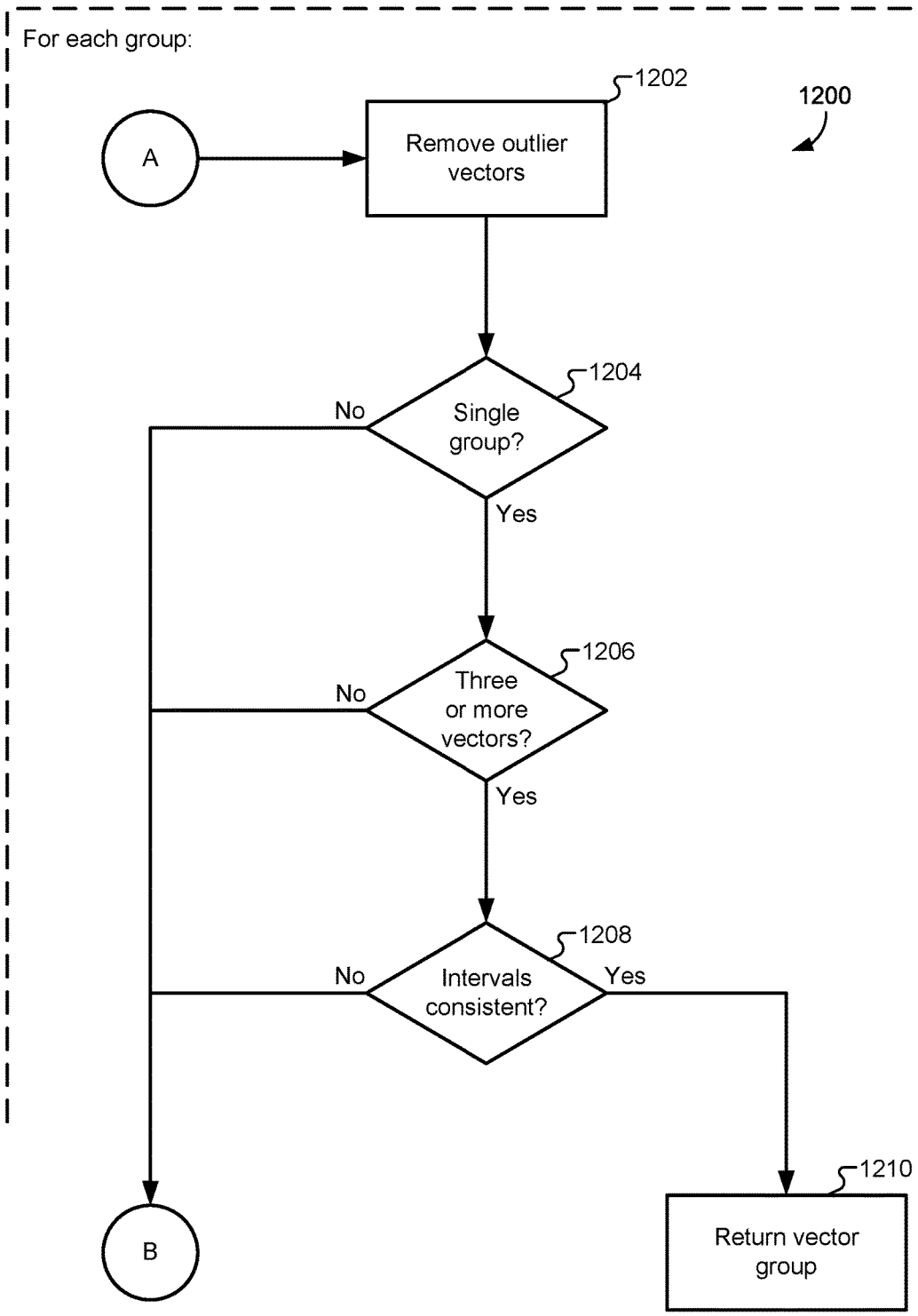
FIG. 12 illustrates a flowchart of a second phase of a method for grouping data vectors, according to some embodiments.

FIG. 12 illustrates a flowchart 1200 of a second phase of a method for grouping data vectors, according to some embodiments. In most cases, additional groups were generated in the flowchart 1100 in FIG. 11 because they represented anomalous or one-time inputs from the issuing computer systems. Statistically, the data vectors in the new groups may represent outliers that are not in line with the rest of the group. If multiple groups were formed, the method may include removing outlier data vectors (1202). For example, if multiple groups were formed at the value field stage, the values can be compared to remove outliers that vary more than a predetermined threshold amount (5%, 10%, 15%, 20%, 25%, etc.) from the average of the rest of the values. If multiple groups performed at the interval stage, then the intervals can be compared to remove outliers that are off by more than 3 days, 5 days, 6 days, 8 days, etc. from the rest of the intervals in the group. Note that some embodiments may only remove value outliers and leave the interval outliers for a subsequent grouping described in relation to FIG. 13. Often, removing the value outliers will inherently remove the interval outliers, as they usually occur in the same data vectors.

In many cases, removing statistical outliers will eliminate the extra groups that were formed in flowchart 1100. If a single group remains after the outliers are removed (1204), then the single group can be checked to determine whether it includes three or more data vectors (1206). As described above, at least three data vectors may be required to calculate a group value that has a high enough confidence level. If three or more data vectors remain, then the group can then be tested to see if the input intervals are now consistent (1208). If the intervals are consistent by falling within the same day ranges described above, then the single group can be returned as a group of vectors (1210) representing a verified value from the associated issuing computer system. As described above, the group may be returned and include a group value calculated to cover a specific time interval. However, if the group fails any of the tests described above (i.e., more than one group, fewer than three data vectors, inconsistent intervals, etc.) the group(s) can be passed to a subsequent stage of the method described in FIG. 13.

Figure 13:
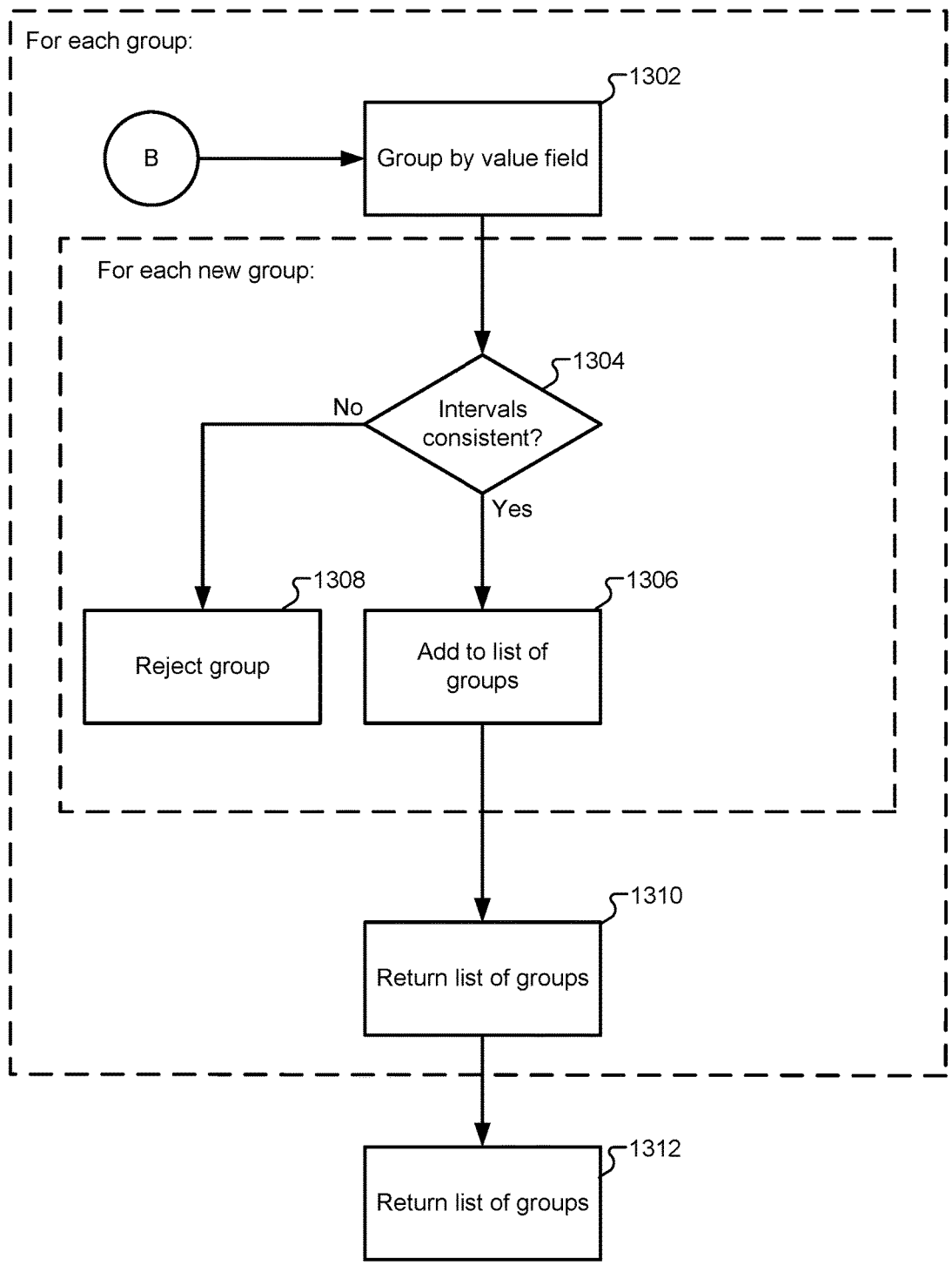
FIG. 13 illustrates a flowchart of a third phase of a method for grouping data vectors, according to some embodiments.

FIG. 13 illustrates a flowchart 1300 of a third phase of a method for grouping data vectors, according to some embodiments. This final stage attempts to identify variable inputs that have inconsistent intervals and/or other abnormal input patterns that can still be connected with a verified value from an issuing computer system. First, a second grouping by the value field can be performed (1302). For each new group formed, a determination can be made whether the input intervals are consistent (1304). If the input intervals are not consistent, then the group can be eliminated from consideration. If the intervals are consistent after the second grouping by value, then the method can add the newly-formed groups to a list of groups to be returned (1306). With each group or list of groups that remains, these can be returned (1310) with a group value calculated as described above. Additionally, the method described in FIGS. 11-13 can be performed for each group of data vectors from different data structures and returned (1312).

Figure 14:
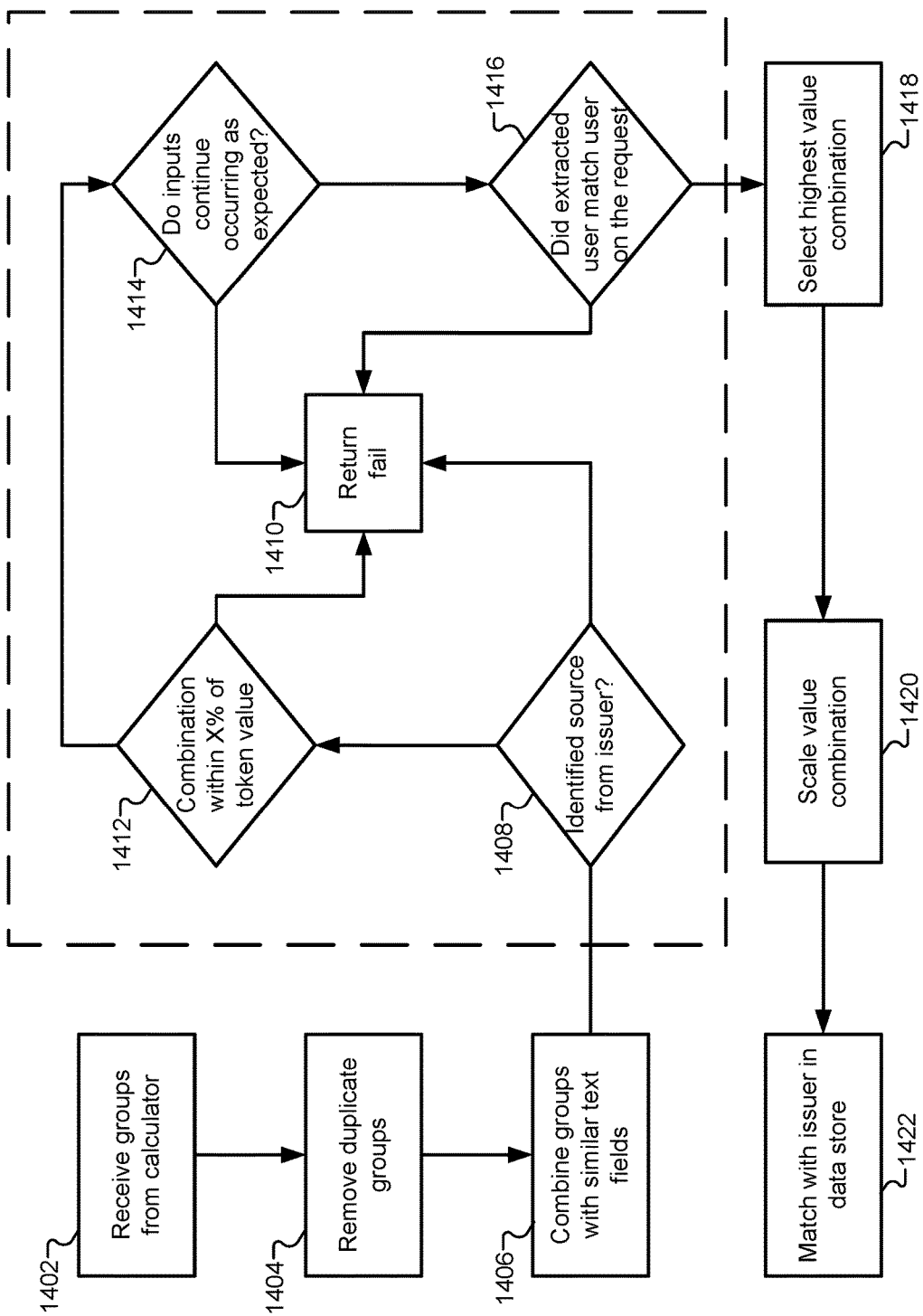
FIG. 14 illustrates a flowchart of a method for validating an unverified token, according to some embodiments.

FIG. 14 illustrates a flowchart of a method for validating an unverified token, according to some embodiments. Using the process described above, the method may receive a plurality of data vector groups from the grouping calculator process of FIGS. 11-13 (1402). The method may then include removing duplicate groups (1404). Duplicate groups may exist when multiple users are associated with the same data structures at the accumulator computer systems. When multiple users request a resource, the same data structure may be retrieved and counted twice, resulting in duplicate groups and values that may contribute to the token estimation process. These duplicates can be eliminated to ensure that each group value is applied only once to the user or group of users requesting access to the resource.

The method may also include combining groups of similar text fields (1406). Multiple groups may be formed from different data structures and/or different accumulator computer systems that had similar text fields and should contribute to the same group value. This can occur when the same issuing computer system provides inputs to multiple data structures in the same accumulator computer system and/or when the same issuing computer system provides inputs to multiple accumulator computer systems for the same verified value.

After removing duplicate groups and combining groups of similar text fields, a series of guardrail checks can be performed before passing each group to the final token estimation calculation. First, a determination can be made for each group as to whether the group can be positively identified as being sourced from an issuing computer system (1408). Other streams of fragmented inputs can come from other data sources that may appear similar to the data vector streams received from the issuing computer systems. However these should not contribute to any verified values for the token estimation process, and can be eliminated at this point. In many embodiments, this check may also be performed earlier in the process, such as prior to the operations of flowchart 1100.

Additionally, the group values for each group can be combined in various combinations to ensure that at least one combination fits within X % of the unverified token value received from the client device (1412), where X is a predefined threshold value, such as 70%, 75%, 80%, 85%, 90%, 95%, and/or the like. Typically, all of the group values can be combined to come within the token value range. However, this process can be used to compensate for data structures that include inputs from issuing computer systems associated with another user who shares the accumulator computer system data structure.

Next, the group values for each group can be analyzed to determine if the inputs continue occurring as expected (1414). For example, if data vectors from a time interval were found to occur on a bi-weekly basis, subsequent data inputs from the issuing computer systems can be analyzed to determine if they continue to be received as inputs on the same interval. Additionally, the external data stores may provide a user identity that can be associated with each data structure and/or data vector. The process can determine whether the extracted user matches the user on the original request from the client device (1416). If any of these checks fail, the then token estimation process can return a failure to the requesting system rather than returning an estimated token value.

If the groups of data vectors survive these guardrail checks, then the groups of data vectors can be used to estimate a token value. These steps may be performed in the Orchestration layer described above rather than in the token estimation process. Thus, the token estimation process can return groups of data vectors with associated group values, and the orchestration layer can evaluate, combine, and scale these values to estimate the token value. First, the process can select combinations of groups of data vectors that provide the highest value when aggregating the group values from each group (1418). In some embodiments, the highest value combination can be selected that falls within the X % range of the unverified token value without exceeding the unverified token value. Each group value contributing to the combination can then be determined to be scaled or unscaled. For group values that are determined to have been previously scaled down by the issuing computer system, a scaling factor can be applied to these group values.

Finally, as described above, substrings strings can be extracted from the text fields of each group of data vectors and sent to the issuer name data store 810. The issuer name data store can extract a known identifier of an issuing computer system to be associated with the group value. At this point, the group values can all be combined into a single estimated token value by aggregating the group values together. The estimated token value can then be compared to the unverified token value provided by the client device. If the estimated token value comes within a predetermined threshold of the unverified token value, the token value can be verified. Verification of the token can automatically generate task addition/removal from a process workflow and/or allow a resource to be provided to a user of the client device.

Figure 15:
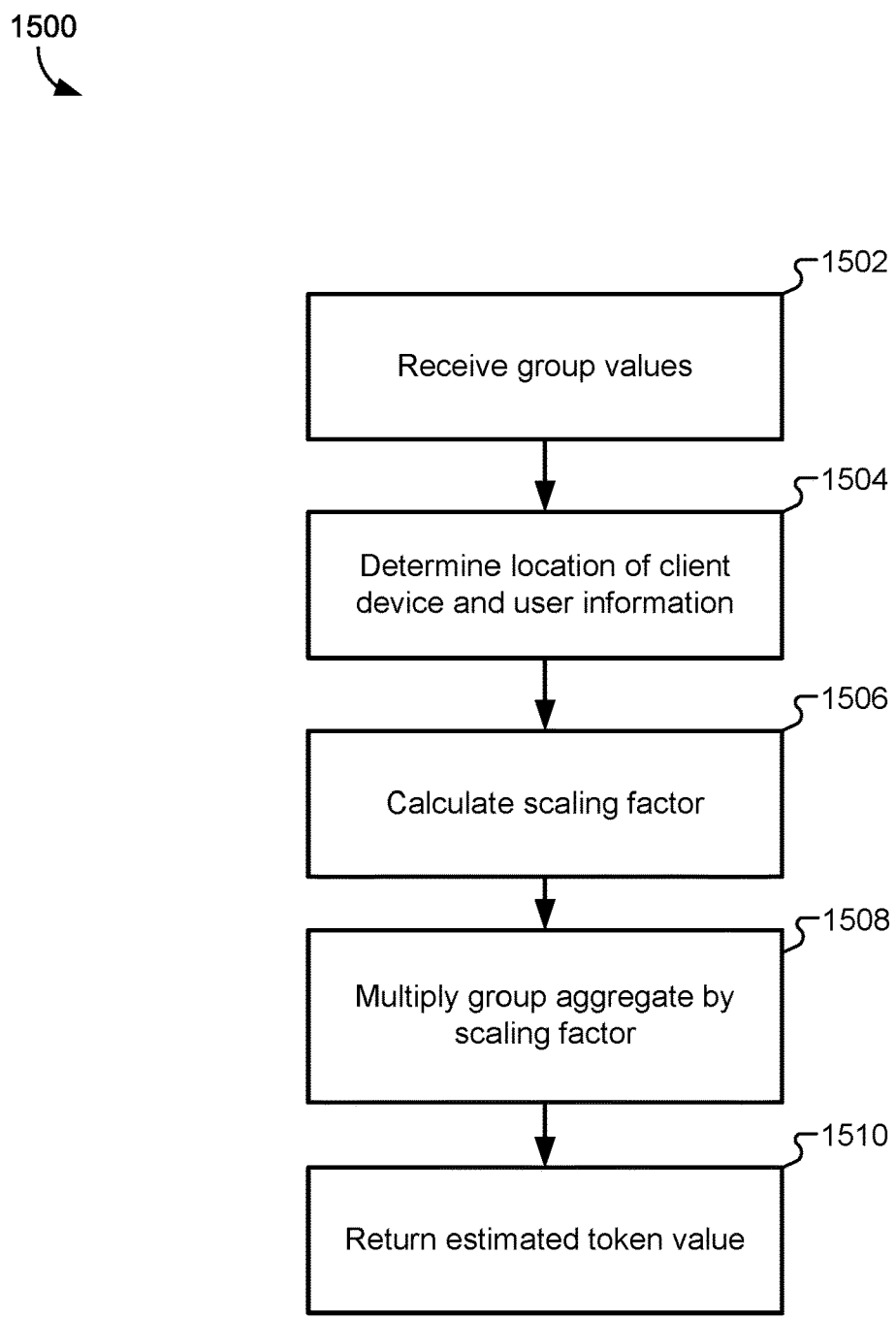
FIG. 15 illustrates a flowchart of a method for determining a scaling factor and scaling a group value, according to some embodiments.

FIG. 15 illustrates a flowchart 1500 of a method for determining a scaling factor and scaling a group value, according to some embodiments. The method may include receiving group values for each of the groups of data vectors that survive the process described above (1502). The method may then include determining a location of the client device and determining user information (1504). The location of the client device 1504 may include a state, county, jurisdiction, or other government boundary that defines a location where the client device is located. Alternatively, the system can extract a location from information received from the user, such as a home address. The user information may include personal identifying information, such as an address, telephone number, an email address, a marital status, and so forth. This information may be stored in a database as described above, or may be requested from the user during a current communication session. This information may be provided by the user during a current/previous communication session with the system as part of a successive presentation of web forms in which the user is asked to provide information for selecting an appropriate resource. Therefore, this information can be retrieved from the user information already provided and stored by the cloud system. As described above, both the data center and the cloud storage system can store user information. Instead of requesting this personal information from the user again, this information can simply be retrieved from the stored information acquired earlier in the process.

The method may also include calculating a scaling factor (1506). The scaling factor may be based on the location of the client device and/or the user, along with the user information. Issuing computer systems may scale values and data vectors based on local rules that apply to specific geographic locations or jurisdictions. Issuing computer systems may also scale values in data vectors based on personal characteristics of the user. In some embodiments, the scaling factor may also be selected based on a total aggregate value of all the group values from the groups of data vectors selected so far.

The method may next include multiplying group values by scaling factors (1508). Groups may be identified as scaled or unscaled based on the fields in the data vectors and/or identifiable character substrings in the text field of the data vectors. Scaled values may be multiplied by the scaling factor to increase those values such that they are a better approximation of the verified value distributed by the issuing computer system. After multiplying the group values by the scaling factor, the group values can be aggregated and combined to form an estimated token value for comparison with the unverified token value as described above.

To calculate the effect of a scaling factor, some embodiments may use the algorithm described below. This algorithm uses brackets of scaling values that are selected based on each group value submitted. Every bracket will include a scaling rate and a maximum value. The algorithm operates by iterating through each of the brackets until the group value drops below 0. In each iteration, the maximum value of the current bracket may be subtracted from the remaining group value. The maximum value may then be multiplied by the scaling rate of the bracket and added to a scaled value. When the group value drops below 0, an unscaled group value may be estimated by multiplying the remainder by the scale rate and adding that amount to the scaled value. Pseudocode for the algorithm is described below.

```
CalculateScaleAmount(BracketInfo, GroupVal) {
  ScaleAmount=0;
  foreach (bracket in BracketInfo) {
    if (GroupVal-BracketInfo.max>=0) {
      ScaleAmount+=BracketInfo.max*BracketInfo.rate;
      GroupVal=GroupVal-BracketInfo.max;
      continue;
    }
    ScaleAmount+=GroupVal*BracketInfo.rate;
    break;
  }
  return ScaleAmount;
}
```

This procedure can be used to calculate one or more scale amounts for each group value. For example, some groups may be subject to two different scaling amounts that use different bracket information. The algorithm described above can be run separately for each scale amount.

Data Center Computer System

Figure 16:
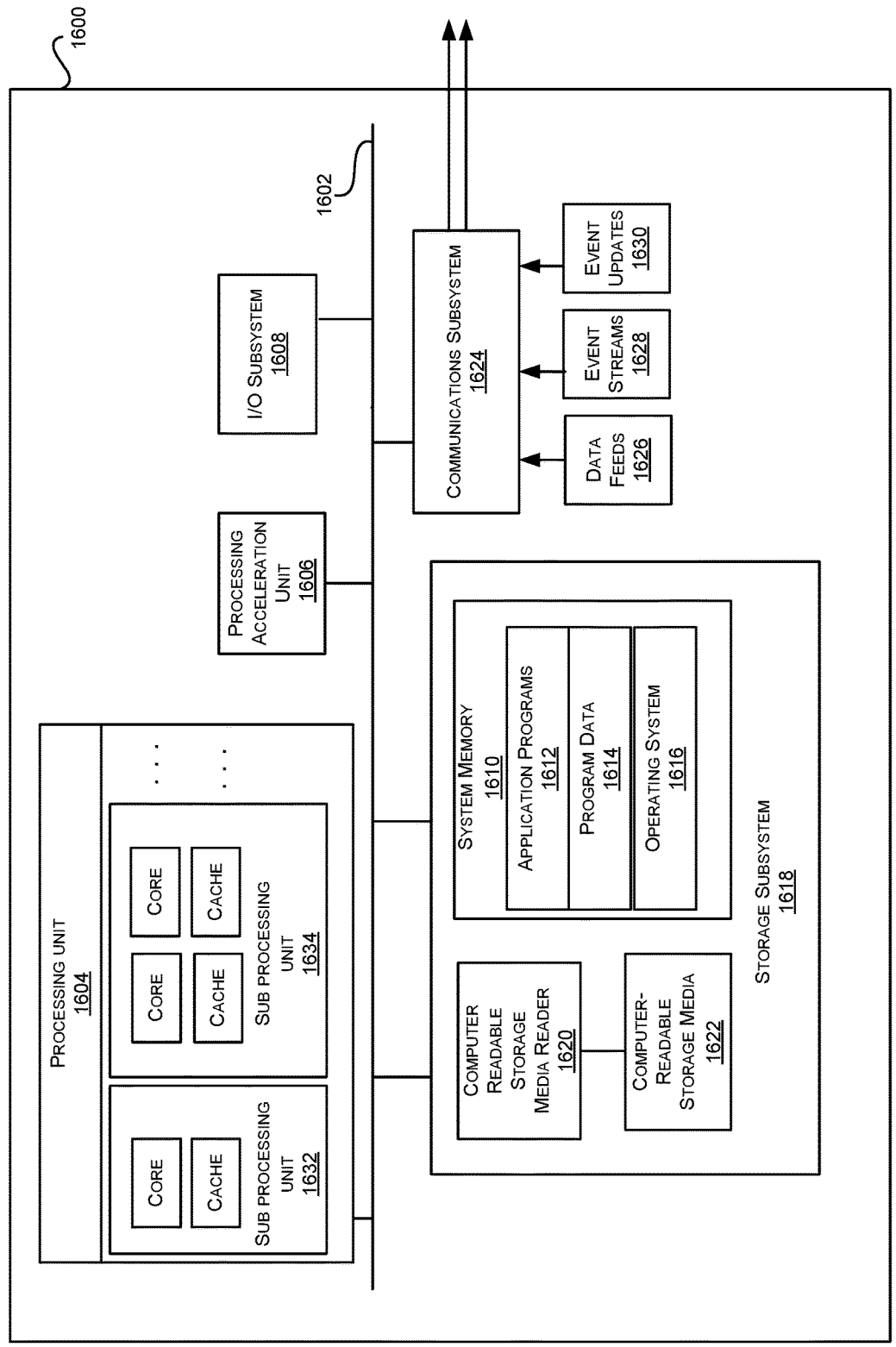
FIG. 16 illustrates an exemplary computer system, in which various embodiments may be implemented.

FIG. 16 illustrates the data center computer system 1600 described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present invention.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for verifying an unverified token received from a client device, the system comprising:
    a front-end website that receives the unverified token from a client device;
    a network interface that accesses one or more external data stores to receive a plurality of data vectors from the one or more external data stores, wherein the plurality of data vectors are associated with a user of the client device;
    one or more processors; and
    one or more memory devices comprising instructions that, when executed by the one or more processors, cause the one or more processors to perform operations comprising:
        filtering data vectors from the plurality of data vectors that are not input data vectors;
        grouping data vectors from the plurality of data vectors into a first one or more groups based at least in part on a text field in each of the plurality of data vectors;
        selecting a second one or more groups from the first one or more groups, wherein each of the second one or more groups comprises data vectors with a similar value field;
        selecting a third one or more groups from the second one or more groups, wherein each of the third one or more groups comprises data vectors with a similar input interval;
        for each of the third one or more groups, determining a group value based at least in part on the value fields and input intervals;
        calculating an estimated token based at least in part on the group values for each of the third one or more groups; and
        determining whether the unverified token can be verified by determining whether the estimated token is within a threshold amount of the unverified token.

2. The system of claim 1, wherein the operations performed by the one or more processors further comprise:
    storing the plurality of data vectors in a system cache after receiving the plurality of data vectors from the one or more external data stores;
    receiving a subsequent request to re-verify the unverified token; and
    retrieving the plurality of data vectors from the system cache rather than the one or more external data stores through the network interface.

3. The system of claim 1, wherein calculating the estimated token comprises:
    combining the group value of a first group in the third one or more groups with the group value of a second group in the third one or more groups.

4. The system of claim 1, wherein the operations performed by the one or more processors further comprise:
    for each of the group values, determining whether the group values were scaled by an issuing computer system before being received from the one or more external data stores;
    determining scaling factors for the scaled group values; and
    applying the scaling factors to the scaled group values before calculating the estimated token.

5. The system of claim 4, wherein the scaling factors are determined based at least in part on (i) a range of the corresponding group value, and (ii) characteristics of the user of the client device.

6. The system of claim 1, wherein the operations performed by the one or more processors further comprise:
    determining a combination of the one or more third groups where the aggregated group values come within 90% of the unverified token value.

7. The system of claim 1, wherein the operations performed by the one or more processors further comprise:
    determining whether each of the third one or more groups include at least three data vectors.

8. The system of claim 1, wherein the operations performed by the one or more processors further comprise:
    extracting a character string from a text field of a data vector in the plurality of data vectors;
    accessing a database of character strings used to identify issuing computer systems; and
    selecting an issuing computer system based on the character string from the text field of the data vector.

9. The system of claim 8, wherein the database of character strings used to identify issuing computer systems comprises:
    a standardized name of each issuing computer system; and
    for each standardized name, a list of character strings that commonly appear in data vectors originating from the corresponding issuing computer system.

10. The system of claim 1, wherein the unverified token is based on one or more verified values provided to a user of the client device from one or more issuing computer systems.

11. A method of verifying an unverified token received from a client device, the method comprising:

receiving the unverified token from a client device through a front-end website;

accessing, through a network interface, one or more external data stores to receive a plurality of data vectors from the one or more external data stores, wherein the plurality of data vectors are associated with a user of the client device;

filtering data vectors from the plurality of data vectors that are not input data vectors;

grouping data vectors from the plurality of data vectors into a first one or more groups based at least in part on a text field in each of the plurality of data vectors;

selecting a second one or more groups from the first one or more groups, wherein each of the second one or more groups comprises data vectors with a similar value field;

selecting a third one or more groups from the second one or more groups, wherein each of the third one or more groups comprises data vectors with a similar input interval;

for each of the third one or more groups, determining a group value based at least in part on the value fields and input intervals;

calculating an estimated token based at least in part on the group values for each of the third one or more groups; and determining whether the unverified token can be verified by determining whether the estimated token is within a threshold amount of the unverified token.

12. The method of claim 11, further comprising adding or removing a task from a task list for a resource based on whether the token can be verified.

13. The method of claim 11, wherein the one or more external data stores receive the plurality of data vectors from one or more issuing computer systems or one or more accumulator systems.

14. The method of claim 13, wherein the front end website provides a portal for the client device to the one or more external data stores to log into the one or more issuing computer systems to release the plurality of data vectors.

15. The method of claim 11, further comprising:

storing the plurality of data vectors in a system cache after receiving the plurality of data vectors from the one or more external data stores;

receiving a subsequent request to re-verify the unverified token; and retrieving the plurality of data vectors from the system cache rather than the one or more external data stores through the network interface.

16. The method of claim 11, further comprising:

for each of the group values, determining whether the group values were scaled by an issuing computer system before being received from the one or more external data stores;

determining scaling factors for the scaled group values; and applying the scaling factors to the scaled group values before calculating the estimated token.

17. The method of claim 16, wherein the scaling factors are determined based at least in part on (i) a range of the corresponding group value, and (ii) characteristics of the user of the client device.

18. The method of claim 11, further comprising:

determining a combination of the one or more third groups where the aggregated group values come within 90% of the unverified token value.

19. The method of claim 11, further comprising:

extracting a character string from a text field of a data vector in the plurality of data vectors;

accessing a database of character strings used to identify issuing computer systems; and selecting an issuing computer system based on the character string from the text field of the data vector.

20. The method of claim 19, wherein the database of character strings used to identify issuing computer systems comprises:

a standardized name of each issuing computer system; and for each standardized name, a list of character strings that commonly appear in data vectors originating from the corresponding issuing computer system.

* * * * *